(12) United States Patent
Singhal et al.

(10) Patent No.: US 7,998,501 B2
(45) Date of Patent: Aug. 16, 2011

(54) NEWBORN INFANT FORMULAS AND FEEDING METHODS

(75) Inventors: Atul Singhal, Watford (GB); Alan Lucas, Cambridge (GB)

(73) Assignee: University College London, Cambridge (GB)

( * ) Notice: Subject to any disclaimer, the term of this patent is extended or adjusted under 35 U.S.C. 154(b) by 789 days.

(21) Appl. No.: 11/822,078

(22) Filed: Jul. 2, 2007

(65) Prior Publication Data

US 2007/0254062 A1   Nov. 1, 2007

Related U.S. Application Data

(60) Division of application No. 10/806,169, filed on Mar. 23, 2004, now abandoned, which is a continuation-in-part of application No. PCT/GB2004/000518, filed on Feb. 9, 2004.

(30) Foreign Application Priority Data

Feb. 10, 2003 (GB) .................................. 0302929.5
Feb. 27, 2003 (GB) .................................. 0304482.3
Aug. 5, 2003 (GB) .................................. 0318270.6

(51) Int. Cl.
*A61K 47/00* (2006.01)
(52) U.S. Cl. ........................................ 424/439; 426/801
(58) Field of Classification Search .................. None
See application file for complete search history.

(56) References Cited

U.S. PATENT DOCUMENTS

| | | | |
|---|---|---|---|
| 1,607,844 A | 11/1926 | Nielsen | |
| 3,649,295 A | 3/1972 | Bernhart | |
| 4,216,236 A | 8/1980 | Mueller et al. | |
| 5,021,245 A | 6/1991 | Borschel et al. | |
| 5,093,143 A | 3/1992 | Behr et al. | |
| 5,492,899 A * | 2/1996 | Masor et al. | 514/47 |
| 5,550,106 A | 8/1996 | Petschow et al. | |
| 5,602,109 A | 2/1997 | Masor et al. | |
| 5,756,680 A | 5/1998 | Ahmed et al. | |
| 6,096,870 A | 8/2000 | Mozaffar et al. | |
| 2003/0026860 A1 | 2/2003 | Lasekan et al. | |
| 2004/0101596 A1 | 5/2004 | Ndife et al. | |
| 2004/0214791 A1 | 10/2004 | Auestad et al. | |

FOREIGN PATENT DOCUMENTS

| | | |
|---|---|---|
| FR | 911522 | 7/1946 |
| JP | 2003-018980 | 1/2003 |
| WO | 9518618 A2 | 7/1995 |
| WO | 0150889 | 7/2001 |
| WO | WO 01/50889 | 7/2001 |
| WO | WO 03/077664 | 9/2003 |
| WO | 2004068968 A1 | 8/2004 |
| WO | 2006069918 A1 | 7/2006 |
| WO | 2007004878 A2 | 1/2007 |
| WO | 2008071667 A1 | 6/2008 |

OTHER PUBLICATIONS

Singhal, A., et al., "A low nutrient intake and early growth for later insulin resistance in adolescents born preterm.", Lancet 2003; vol. 361, pp. 1089-1097.
Singhal, A., et al., "Breastmilk feeding and lipoprotein profile in adolescents born preterm: follow-up of a prospective randomised study.", Lancet 2004; vol. 363, pp. 1571-1578.
Singhal, A., et al., "Is slower early growth beneficial for long-term cardiovascular health?", Circulation 2004; vol. 109, pp. 1108-1113.
Singhal, A., et al., "Early origins of cardiovascular disease. Is there a unifying hypothesis?", Lancet 2004; vol. 363, pp. 1642-1645.
Stettler, N., et al., "Weight gain in the first week of life and overweight in adulthood.", Circulation 2005; vol. 111, pp. 1897-1903.
Singhal, A., et al., "Early nutrition in preterm infants and later blood pressure; two cohorts after randomised trials.", Lancet 2001; vol. 357, pp. 413-419.
Owen, C.G., et al., "Effect of infant feeding on the risk of obesity across the life course: a quantitative review of published evidence.", Pediatrics 2005; vol. 115, pp. 1367-1377.
Martin, R.M., et al., "Breast feeding and cardiovascular disease risk factors, incidence, and mortality: the Caerphilly study.", J. Epidemiol Community Health 2005; vol. 59, pp. 121-129.
Chomtho, S., et al., "Infant growth and later body composition: evidence form the 4-component model.", Am J. Clin. Nutr. 2008; pp. 1776-1784.
Arenz, S., et al., "Breast-feeding and childhood obesity—a systematic review.", Int. J. Obes. 2004; vol. 28, pp. 1247-1256.
Owen, C.G., "Does initial breastfeeding lead to lower blood cholesterol in adult life?", Am. J. Clin. Nutr. 2008; vol. 88, pp. 305-314.
Owen, C.G., et al., The effect of breastfeeding on mean body mass index throughout life: a quantitative review of published and unpublished observational evidence., Am J. Clin. Nutr. 2005; vol. 82, pp. 1298-1307.
Owen, C.G., et al., "Does breastfeeding influence risk of type 2 diabetes in later life? A quantitative analysis of published evidence.", Am. J. Clin. Nutr. 2006; vol. 84, pp. 1043-1054.
Hardner, T., et al., "Duration of Breastfeeding and Risk of Overweight: a meta-Analysis.", Am. J. Epidemiol. 2005; vol. 162, pp. 397-403.
Owen, C.G., et al., Effect of breast feeding in infancy on blood pressure in later life: systematic review and meta-analysis; BMJ 2003; vol. 327, pp. 1189-1195.
Fomon, S., et al., "Influence of Formula Concentration on Caloric Intake and Growth of Normal Infants," Acta Paediatr Scand 1975; vol. 64, pp. 172-181.
Fomon, S., et al., "Infant Nutrition," 2nd Ed. (1974), pp. 27-29.

(Continued)

*Primary Examiner* — Robert A Wax
*Assistant Examiner* — Melissa Mercier

(57) ABSTRACT

Disclosed are newborn infant formulas comprising fat, carbohydrate, and from 0.5 to 2.5 g of protein per 100 ml of formula, wherein the formula has a caloric density of from 25 to 50 kcal per 100 ml of formula. Also disclosed are methods of administering the infant formulas to provide newborns with optimal nutrition, to reduce the occurrence or extent of insulin resistance in an individual later in life, to reduce the occurrence or extent of atherosclerosis or coronary artery disease in an individual later in life, or combinations thereof, by feeding newborn infants the newborn infant formula described herein.

14 Claims, No Drawings

OTHER PUBLICATIONS

Dennison, B., et al., "Rapid Infant Weight Gain Predicts Childhood Overweight," Obesity (Mar. 3, 2006), vol. 14, No. 3, pp. 491-498.

Eid, E., "Follow-Up Study of Physical Growth of Children Who Had Excessive Weight Gain in First Six Months of Life," Agriculture and Health (Apr. 11, 1970), pp. 74-76.

Gillman, M., "The first months of life: a critical period for development of obesity," Am. J. Clin. Nutr. 2008, vol. 87, pp. 1587-1589.

Martin, R., et al., "Infant nutrition and blood pressure in early adulthood: the Barry Caerphilly Growth Study," Am. J. Clin. Nutr. 2003; vol. 77, pp. 1489-1497.

Singhal, A., et al., "Early nutrition and leptin concentrations in later life," Am. J. Clin. Nutr. 2002; vol. 75, pp. 993-999.

Monterio, P.O.A., and Victora, C. G., "Rapid growth in infancy and childhood and obesity in later life—a systemic review," Obesity 2005; vol. 6, pp. 143-154.

Botton, J, et al., "Postnatal weight and height growth velocities at different ages between birth and 5 y and body composition in adolescent boys and girls," Am. J. Clin. Nutr. 2008; vol. 87, pp. 1760-1768.

Lucas, A., "Programming by early nutrition in man," CIBA Foundation Symposium 156 (1991), pp. 38-55.

Stettler, N., et al., "Rapid weight gain during infancy and obesity in young adulthood in a cohort of African Americans," Am. J. Clin. Nutr. 2003; vol. 77, pp. 1374-1378.

Stettler, N., "Nature and strength of epidemiological evidence for origins of childhood and adulthood obesity in the first year of life," Pediatric Rev. 2007; vol. 31, pp. 1035-1043.

Yanovski, J., "Rapid weight gain during infancy as a predictor of adult obesity," Am. J. Clin. Nutr. 2003; vol. 77, pp. 1350-1351.

Stettler, N., American Heart Association Weight Gain in the First Week of Life and Overweicht in Adulthood: A Cohort Study of European American Subject Fed Infant Formula.

Anderson, Sue Ann, American Journal of Clinical Nutrition 35, Feb. 1982 History & Current Status of Infant Formulas.

Singhal, Atul, American Soc for Clinical Nutrition 2002; 75993-9 Early Nutrition & Leptin Concentrations in Later Life.

Proietto, j. and Thorburn, A.W., Baillieres Clin. Endocrinol Metab 1994; 8: 509-25 Animal Models of Obesity-Theories of Aetiology.

Wilson, A.C., et al., Relation of Infant Diet to Childhood Health: Seven Year Follow Up of Cohort of Children in Dundee Infant Feeding Study.

Celermajer, D.S., et al., Circulation 1993; 88: 2149-2155 Cigarette Smoking is Associated With Dose-Related and Potentially Reversible Impairment of Endothelium-Dependent Dilation in Healthy Young Adults.

Curhan, G.C., et al., Circulation 1996; 94: 3246-50 Prevention of Cardiovacular Disease: Birth Weight and Adult Hypertension, Diabetes Mellitus, and Obesity in US Men.

Schachlinger, V., Circulation 2000; 101: 1899-1906 Prognostic Impact of Coronary Vasodilator Dysfunction on Adverse Long-Term Outcome of Coronary Heart Disease.

CODEX STAN 72-1981 Standard for Infant Formula and Formulas for Special Medical Purposes Intended for Infants.

Gerstenberger, H.J., Gerstenberger 1 US Journal of Diseases of Children Oct. 1915 Studies in the Adaptation of an Artificial Food to Human Milk.

Gerstenberger, H.J., Gerstenberger 2 US Journal of Diseases of Children Jan. 1919 Studies in the Adaptation of an Artificial Foor to Human Milk.

Lewis, D.S., J. Clin. Invest 1986; 78: 899-905 Preweaning Food Intake Influences the Adiposity of Youg Adult Baboons.

Kramer, M.S., J. Pediatric. 1991; 98: 883-7 Do Breast-Feeding and Delayed Introduction of Solid Foods Protect Against Subsequent Obesity?

Lancet 2001; 357: 1880-81 Neonatal Salt Intake and Blood Pressure Correspondence.

Singhal, A., Lancet 2004; 363: 1642-45 Early Origins of Cardiovascular Disease: Is There a Unifying Hypothesis?

Gore, S.M., Lancet vol. 361 Mar. 2003 Low Nutrition Intake & Early Growth for Later Insulin Resistance in Adolescents Born Preterm Singhal, Atul 157 ICH,002-PCT-US-CIP1 Lipids 1999; 34: 185-97 Statistical Considerations in Infant Nutrition Trials.

DeWit, J.N., Marschall Rhone-Poulenc Award Lecture Nutritional & Functional Characteristics of Whey Proteins in Food Products.

Lucas, A., MRC Dunn Nutrition Unit Programming by Early Nutrition in Man.

Singhal, A., The Lancet vol. 357 Feb. 2001 Early Nutrition in Preterm Infants and Later Blood Pressure: Two Cohorts After Randomised Trials.

Singhal, A., The Lancet vol. 565 May 2004 Breatmilk Feeding and Lipoprotein Profile in Adolescents Born Preterm: Follow-Up of a Prospective Randomised Study.

Stettler, N., et al., Circulation 2005: 111, 1897-1903.

Singhal, A., et al., "Early Nutrition in Preterm Infants and Later Blood Pressure: Two Cohorts After Randonised Trials", Lancet 2001: 357:pp. 413-419.

Law, C.A., et al. "Is Blood Pressure Inversely Related to Birth Weight? The Strength of Evidence From a Systematic Review of the Literature", J. Hypertens 1996: 14: pp. 934-935.

Barker, D.J.P., et al., "The Relation of Small Head Circumference and Thinness At Birth to Death From Cardiovascular Disease in Adult Life", BMJ 1993: 306: pp. 422-426.

Barker, D.J.P., et al., "Growth in Utero. Blood Pressure in Childhood and Adult Life, and Mortality From Cardiovascular Disease", BMJ 1989; 298: pp. 564-567.

Whincup, P.H., et al., Early Influences on Blood Pressure: A Study of Children Aged 5-7 Years, BMJ 1989; 299: pp. 587-591.

Whincup, P.H., et al., "Do Maternal and Intrauterine Factors Influence Blood Pressure in Childhood", Arch Dis Child 1992, 67: pp. 1423-1429.

Law, C.A., et al., "Initiation of Hypertension in Utero and Its Amplification Throughout Life", BMJ 1993; 306: pp. 24-27.

Whincup, P.H., et al., "Birth Weight and Blood Pressure: Cross Sectional an Longitudinal Relations in Childhood", BMJ 1995; 311: pp. 773-776.

Taittonen, L., et al., Prenatal and Postnatal Factors in Predicting Later Blood Pressure Among Children; Cardiovascular Risk in Young Finns, Pediatr Res 1996; 40: pp. 627-632.

Barker, D.J.P., et al., "Weight Infancy and Death From Ischaemic Heart Disease", Lancet 1989; 2: pp. 577-580.

Wilson, A.C., et al., "Relation of Infant Diet to Childhood Health: Seven Yeaf Follow Up of Cohort of Children in Dundee Infant Feeding Study" BMJ 1998; 316:pp. 21-25.

Lucas, A., et al., "Multicentre Trial . . . ,' Feeding of Low Birthweight Infants: Effects of Diet on Early Growth", Arch Dis CHiLu 1984; 59:pp. 722-730.

Lucas, A., et al., "Randomised Trial of Early Diet in Preterm Babies and Later Intelligence Quotient", BMJ 1998; 317:pp. 1481-1487.

Lucas, A., et al., "Fetal Origins of Adult Disease—The Hypothesis Revisited", BMJ 1999: 319: pp. 243-249.

Lucas, A., et al., "Does Early Nutrition in Infants Born Before Term Programme Later Blood Pressure?", BMJ 1994; 309: pp. 304-308.

Freeman, J.V., et al., "Cross Sectional Stature and Weight Reference Curves for the UK, 1990", Arch Dis Child 1990; 73: pp. 17-24.

Leeson, C.P.M., et al., "Flow-Mediated Dilation in 9- to 11-Year-Old Children: The Influence of Intrauterine and Childhood Factors", Circulation 1997; 96: pp. 2233-2238.

Gore, S.M., et al., "Statistical Considerations in Infant Nutrition Trials", Lipids 1999: 34: pp. 185-197.

Anwar, Y.A., et al., Evaluation of the Datascope Accutor Plus According to the Recommendations of the Association for the Advancement of Medical Instrumentation, Blood Press Monit 1997; 2: pp. 105-110.

Baranowski, T., et al., "Height, Infant-Feeding Practices and Cardiovascular Functioning Among 3 or 4 Year Old Children in Three Ethnic Groups", J. Clinic Epidemiol 1992; 45:513-18.

Lewis, D.S., et al., "Preweaning Food Intake Influences the Adiposity of Young Adult Baboons", J. Clin Invest 1986; 78: pp. 899-905.

Lewis, D.S., et al., "Deferred Effects of Preweaning Diet on Atherosclerosis in Adolescent Baboons", Atherosclerosis 1988; 8:274-80.

Glelijnse, J.M., et al., "Long-Term Effects of Neonatal Sodium Restriction on Blood Pressure", Hypertension 1997; 29: pp. 913-917.

Whitten, C.F., et al., "The Effect of Dietary Socium in Infancy on Blood Pressure and Related Factors", Acth Pediatr Scand 1980; 279: pp. 1-17.

Lucas, A., et al., "Early Sodium Intake and Later Blood Pressure in Preterm Infants", Arch Dis Child 1988;63: pp. 656-657.

Seidam, D.S., et al., "Birth Weight, Current Body Weight, and Blood Pressure in Late Adolescence", BMJ 1991; 302: pp. 1235-1237.

Laor, A., et al., "Size At Birth, Maternal Nutrition Status in Pregnancy, and Blood Pressure At Age 17: Population Based Analysis", BMJ 1997; 315: pp. 449-453.

Leon, D.A., et al. "Reduced Fetal Growth Rate and Increased Risk of Death From Ischaemic Heart Disease: Cohort Study of 15000 Swedish Men and Women Born 1915-29", BMJ 1998; 317: pp. 241-245.

Cook, N. R., et al., Implications of Small Reductions in Diastolic Blood Pressure for Primary Prevention, Arch Intern Med 1995; 155: pp. 701-709.

Ebrahim, S., et al., "Lowering Blood Pressure: A Systematic Review of Sustained Effects of Nonpharmacological Interventions", J. Public Health Med 1998; 20: pp. 441-448.

Garofalo, R.P., et al., "Cytokines, Chemokines, and Colony Stimulating Factors in Human Milk: The 1997 Update", Biol Neonate 1998; 74:pp. 134-142.

"Neonatal Salt Intake and Blood Pressure" "Correspondence", Lancet 2001; 357:1880-81.

Oh, W., "Renal Functions and Clinical Disorders in the Neonate", Clin Perinatal 1981; 8:pp. 215-223.

Irving, R.J., et al., "Adult Cardiovascular Risk Factors in Premature Babies", Lancet 2000; 355: pp. 2135-2136.

Modi, N., "Hyponatraemia in the Newborn", Arch Dis Child Fetal Neonatal 1998; 78: pp. F81-F84.

Marangoni, F., et al., "Polyunsaturated Fatty Acid Concentrations in Human Hindmilk Are Stable Throughout 12-Months of Lactation and Provide a Sustained Intake to the Infant During Exclusive Breast-Feeding: An Italian Study" Br. J. Nutr 2000; 84: pp. 103-109.

Pauletto, P., et al., "Blood Pressure and Atherogenic Lipoprotein Profiles of Fish-Diet and Vegetarian Villagers in Tanzania: The Lugalawa Study" , Lancet 1996; 348: pp. 784-788.

Yosefy, C., et al., "The Effect of Fish Oil on Hypertension, Plasma Lipids and Hemostasis in Hypertensive, Obese, Dyslipidemic Patients With and Without Diabetes Mellitus", Prostaglandins Leukot Essen Fatty Acids 1999; 61: pp. 83-87.

Koukkou, E., et al., "Offspring of Normal and Diabetic Rats Fed in Pregnancy Demonstrate Vascular Dysfunction", Circulation 1998; 98:pp. 2899-2904.

Singhal, A., et al., "Early Nutrition and Leptin Concentrations in Later Life 1-3", Am. J. Olin. Nutr 2002; 75: pp. 993-999.

Cuhran, G.C., et al., "Prevention of Cardiovascular Disease: Birth Weight and Adult Hypertension, Diabetes Mellitus and Obesity in U.S. Men", Circulation 1996; 94: pp. 3246-3250.

Freedman, D.S., et al., "Secular Increases in Relative Weight and Adiposity Among Children Over Two Decades: The Bogalusa Heart Study", Paediatrics 1997; 99: pp. 420-426.

Dietz, W., "Critical Periods in Childhood for the Development of Obesity 1-3", Am. J. Clin. Nutr 1994; 59: pp. 955-959.

Ravelli, G.-P., et al., "Obesity in Young Men After Famine Exposire in Utero and Early Infancy" , N. Eng. J. Med 1976; 295: pp. 349-353.

Ravelli, A.C.J., et al., "Obesity At the Age of 50 Y in Men and Women Exposed to Famine Prenatally 1-3", Am. J. Clin. Nutr. 1999; 70: pp. 811-816.

Parsons, T.I., et al., "Childhood Predictors of Adult Obesity: A Systemic Review", Int.J. Obes. Relat. Metab Disord 1999; 23(Supp): pp. S1-S107.

Seidman, D.S., et al., "A Longitudinal Study of Birth Weight and Being Overweight in Late Adolescence", Am. J. Dis. Child 1991 145: pp. 782-785.

Curhan, G.C., et al., "Congestive Heart Failure/Ventricular Hypertrophy/Heart Transplantation: Birth Weight and Adult Hypertension and Obesity in Women", Circulation 1996; 94: pp. 1310-1315.

Sorenson, H.T., et al., "Relation Between Weight and Length At Birth and Body Mass Index in Young Adulthood: Cohort Study", BMJ 1997; 315: pp. 1137.

Law, C.M., et al., "Early Growth and Abdominal Fatness in Adult Life", J. Epidemio. Community Health 1992; 46: pp. 184-186.

Fall, C.H.D., et al., "Fetal and Infant Growth and Cardiovacsular Risk Factors in Women", BMJ 1995; 310: pp. 428-432.

Malina, R.M., et al., "Birth Weight and Its Relationship to Size Attained and Relative Fat Distribution at 7 to 12 Years of Age", Obes Res 1996; 4: pp. 385-390.

Barker, M., et al., "Birth Weight and Body Fat Distribution in Adolescent Girls", Arch Dis Child 1997; 77: pp. 381-383.

Charney, E., et al., "Childhood Antecedents of Adult Obesity. Do Chubby Infants Become Obese Adults?", N. Eng. J. Med. 1976; 295: pp. 6-9.

Wilson, A.C., et al., "Relation of Infant Diet to Childhood Health: Seven Year Follow Up of Cohort of Children in Dundee Infant Feeding Study", BMJ 1998; 316: pp. 21-25.

Kramer, M.S., "Do Breastfeeding and Delayed Introduction of Solid Foods Protect Against Subsequent Obesity?", J. Pediatric 1991; 98: pp. 883-887.

Elliott, K.G., et al., "Duration of Breastfeeding Associated With Obesity During Adolescence", Obes. Res. 1997; 5: pp. 538-541.

Von Kries, R., et al., "Breastfeeding and Obesity: Cross-Sectional Study", BMJ 1999; 319: pp. 147-150.

Agras, W.S., et al., "Influence of Early Feedings Style on Adiposity At 6 Years of Age", J. Pediatrics 1990; 116: pp. 805-809.

Long, K.K., et al., "Association Between Postnatal Catch-Up Growth and Obesity in Childhood: Prospective Cohort Study", BMJ 2000; 320: pp. 967-971.

McCance, R.A., et al., "The Determinants of Growth and Form", Proc. R. Soc. Lond. B. Biol. Sci. 1974; 185: pp. 1-17.

Lewis, D.S., et al., "Preweaning Food Intake Influences the Adiposity of Youn Adult Baboons", J. Clin. Invest. 1986; 78: pp. 899-905.

Lonnqvist, F., et al., "Overexpression of the Obese (OB) Gene in Adipose Tissue of Human Obese Subjects", Nat. Med. 1995; 1: pp. 950-953.

Maffei, M., et al., "Leptin Levels in Human and Rodent: Measurement of Plasma Leptin and OB RNA in Obese and Weight-Reduced Subjects", Nat. Med. 1995; 11: pp. 1155-1161.

Hamilton, B.S., et al., "Increased Obese MRNA Expression in Omental Fat Cells From Massively Obese Humans", Nat. Med. 1995; 1: pp. 953-956.

Considine, R.V., et al., "Serum Immunoreactive-Leptin Concentrations in Normal Weight and Obese Humans", N. Engl. J. Med. 1996; 334: pp. 292-295.

Klein, S., et al., "Adipose Tissue Leptin Production and Plasma Leptin Kinetics in Humans", Diabetes 1996; 45: pp. 984-987.

Lissner, L., et al., "Birth Weight, Adulthood BMI, and Subsequent Weight Gain in Relation to Leptin Levels in Swedish Women", Obes. Res. 1999; 7: pp. 150-154.

Phillips, D.I.W., et al., "Size At Birth and Plasma Leptin Concentrations in Adult Life", Int. J. Obes. Relat. Metab. Disord. 1999; 23: pp. 1025-1029.

Duke, P.M., et al., "Adolescents' Self-Assessment of Sexual Maturation", Paediatrics 1980; 66: pp. 918-920.

Bennett, F.I., et al., "Leptin Concentration in Women Is Influenced by Regional Distribution of Adipose Tissue 1-3", Am. J. Clin. Nutr. 1997; 66: pp. 1340-1344.

Havel, P.J., et al., "Relationship of Plasma Leptin to Plasma Insulin and Adiposity in Normal Weight and Overweight Women: Effects of Dietary Fat Content and Sustained Weight Loss", J. Clin. Endo. Metab. 1996; 81: pp. 4406-4413.

Cole, T.J., Sympercents: Symmetric Percentage Differences on the 100 Log Scale Simplify the Presentation of Log Transformed Data:, Stat. Med. 2000; 19: pp. 3109-3125.

Clark, P.M., et al., Size At Birth and Adrenaocortical Function in Childhood:, Clin. Endo. 1996; 45: pp. 721-726.

Huamg, X.F,, et al., "Upregulation of Leptin Receptor MRNA Expression in Obese Mouse Brain", Neuroreport 1997; 8: pp. 1035-1038.

Dyer, C.J., et al., "Leptin Receptor MRNA Is Expressed in Ewe Anterior Pituitary and Adipose Tissues and Is Differentially Expressed Inhypothalamic Regions of Well-Fed and Feed-Restricted Ewes", Domestic Anim. Endo. 1997; 14: pp. 119-128.

Chessler, S.D., et al., "Increased Plasma Leptin Levels Are Associated With Fat Accumulation in Japanese Americans", Diabetes 1998; 47: pp. 239-243.

Lindroos, A.K., et al., "Familial Predisposition for Obesity May Modify the Predictive Value of Serum Leptin Concentrations for Long-Term Weight Change in Obese Women", Am. J. Clin. Nutr. 1998; 67: pp. 1119-1123.

Ravussin, E., et al., "Relatively Low Plasma Leptin Concentrations Precede Weight Gain in Pima Indians", Nat. Med. 1997; 3: pp. 238-240.

Morley, R., et al., "Randomized Diet in the Neonatal Period and Growth Performance Until 7.5-7 Y of Age in Preterm Children", Am. J. Clin. Nutr. 2000; 71: pp. 822-828.

Czajka-Narins, D.M., et al., "Supplementary Feeding During the Preweaning Period Effect on Carcass Composition and Adipose Tissue Cellularity of the Rat", Biol. Neonate 1974; 25: pp. 176-185.

Rolland-Cachera, M.F., et al., "Influence of Macronutrients on Adiposity Development: A Follow Up Study of Nutrition and Growth From 10 Months to 8 Years of Age", Int. J. Obes. Relat. Metab. Disord. 1995; 19: pp. 573-578.

Plagemann, A., et al., "Observations on the Orexigenic Hypothalmic Neuropeptide Y-System in Neonatally Overfed Weaning Rats", J. Neuroendo. 1999; 11: pp. 541-546.

Singhal, A., et al., "Low Nutrient Intake and Early Growth for Later Insulin Resistance in Adolescents Born Preterm", Lancet 2003; 361: pp. 1089-1097.

Metcalfe, N.B., et al., "Compensation for a Bad Start: Grow Now, Pay Later?", Trends Ecol. Evol. 2001; 16: pp. 254-260.

McCay, C.M., et al., "The Effect of Retarded Growth Upon the Length of Life Span and Upon the Ultimate Body Size", J. Nutr. 1935; 10: pp. 63-79.

Roth, G.S., et al., "Effects of Reduced Energy Intake on the Biology OG Aging: The Primate Model", Eur. J. Clin. Nutr. 2000; 54 (Suppl): pp. S10-S20.

Hahn, P., "Effect of Litter Size on Plasma Cholesterol and Insulin and Some Liver and Adipose Tissue Enzymes in Adult Rodents", J. Nutr. 1984; 114: pp. 1231-1234.

Plagemann, A., et al., "Obesity and Enhanced Diabetes and Cardiovascular Risk in Adult Rats Due to Early Postnatal Overfeeding", Exp. Clin. Endo. 1992; 99: pp. 154-158.

Plagemann, A., et al., "Perinatal Elevation of Hypothalmic Insulin, Acquired Malformation of Hypothalamic Galaninergic Neurons, and Syndrome X-Like Alterations in Adulthood of Neotally Overfed Rats", Brain Research 1999; 836: pp. 146-155.

Hokken-Koelega, A.C.S., et al., "Children Born Small for Gestational Age: Do They Catch Up?", Pediatr. Res. 1995; 38: pp. 267-271.

Karlberg., J., et al., "Growth in Full-Term Small-For-Gestational-Age Infants: From Birth to Final Height", Pediatr. Res. 1995; 38: pp. 733-739.

Law, C.M., "Significance of Birth Weight for the Future", Arch. Dis. Child Fetal Neonatal 2002; 86: pp. F7-F8.

Hales, C.N., et al., "Fetal and Infant Growth and Impaired Glucose Tolerance At Age 64", BMJ 1991; 303: pp. 1019-1022.

Singhal, A., et al., "Preterm Birth, Vascular Function, and Risk Factors for Atherosclerosis", Lancet 2001; 358: pp. 1159-1160.

Fewtrell, M., et al., "Effects of Size At Birth, Gestational Age and Early Growth in Preterm Infants on Glucose and Insulin Concentrations At 9-12 Years", Diabetologia 2000; 43: pp. 714-717.

Eriksson, J.G., et al., "Early Growth and Coronary Heart Disease in Later Life: Longitudinal Study", BMJ 2001; 322: pp. 949-953.

Stettler, N., et al., "Infant Weight Gain and Childhoon Overweight Status in a Multigenter, Cohort Study", Pediatrics 2002; 109: 194-199.

Cianfarani, S., et al., "Low Birthweight and Adult Insulin Resistance: The "Catch-Up Growth" Hypothesis", Arch. Dis. Child Fetal Neonatal Ed. 1999; 81: pp. F71-F73.

Gelding, S.V., et al., "Increased Secretion of 32, 33 Split Proinsulin After Intraveneous Glucose-Tolerant First-Degree Relatives of Patients With Non-Insulin Dependent Diabetes of European, But Not Asian, Origin", Clin. Endocrinol. 1995; 44: pp. 255-264.

Mykkaned, S.M., et al., "Serum Proinsulin Levels Are Disproportionately Increased in Elderly Prediabetic Subjects", Diabetologia 1995; 38: pp. 1176-1182.

Deiber, M., et al., "Functional Hypersomatotropism in Small Amounts for Gestational Age (SGA) Newborn Infants", J. Clin. Endo. Metab. 1989; 68: pp. 232-234.

Phillips, D.I.W., et al., "Thinness At Birth and Insulin Resistance in Adult Life", Diabetologia 1994; 37: pp. 150-154.

Kramer, M.S., et al., "Impact of Intrauterine Growth Retardation and Body Proportionality on Fetal and Neonatal Outcome", Pediatrics 1990; 85: pp. 707-713.

Fall, C.H.D., et al., "Relation of Infant Feeding to Adult Serum Cholesterol Concentration and Death From Ischaemic Heart Disease", BMJ 1992; 304: pp. 801-805.

Lucas, A., et al., "Breast V. Bottle: Endocrine Responses Are Different With Formula Feeding", Lancet 1980; 1: pp. 1267-1269.

Colle, E., et al., "Insulin Responses During Catch-Up Growth of Infants Who Were Small for Gestational Age", Pediatrics 1976; 57: pp. 363-371.

Pettitt, D.J., et al., "Breast Feeding and Incidence of Non-Insulin-Dependent Diabetes Mellitus in Pima Indians", Lancet 1997; 350: pp. 166-168.

Wareham, N.J., et al., Fasting Proinsulin Concentrations Preduct the Development of Type 2 Diabetes:, Diabetic Care 1999; 22: pp. 262-270.

"Early Postnatal Undernutrition in Preterm Infants and Reduced Risk of Insulin Resistance", Lancet 2003; 36: pp. 2248-2249.

Ong, K.K., et al., "Perinatal Growth Failure: The Road to Obesity, Insulin Resistance and Cardiobascular Disease in Adults", Best Prac. Res. Clin. Epidemiol. Metab. 2002; 16: pp. 191-207.

Woods, K.A., et al., "The Somatotropic Axis in Short Children Born Small for Gestational Age: Relation to Insulin Resistance", Pediatr. Res. 2002; 51: pp. 76-80.

Fritsche, A., et al., "Relationships Among Age, Proinsulin Conversion, and Beta-Cell Function in Nondiabetic Humans", Diabetes 2002; 51 (Suppl): pp. S234-S239.

Chin, D., et al., "Proinsulin in Girls: Relationships to Obesity, Hyperinsulinemia, and Puberty", J. Clin. Endo. Metab. 2002; 87: pp. 4673-4677.

Davies, D.P., et al., "Association Between Infant Nutrition and Blood Pressure in Early Adulthood: The Barry Caerphilly Growth Cohort Study", Arch. Dis. Child 2003; 88: pp. A2-A3 (Abstr).

Singhal, A., et al., "Is Slower Early Growth Beneficial for Long-Term Cardiovascular Health?", Circulation 2004; 109:9: pp. 1108-1113.

Eriksson, J.G., et al., Catch-Up Growth in Childhood and Death From Coronary Heart Disease: Longitudinal Study, BMJ 1999; 318: pp. 427-431.

Parsons, T.J., et al., "Fetal and Early Life Growth and Body Mass Index From Birth to Early Adulthood in 1958 British Cohort: Longitudinal Study", BMJ 2001; 323: pp. 1331-1335.

Law, C.W., et al., "Fetal, Infant, and Childhoon Growth and Adult Blood Pressure: A Longitudinal Study From Birth to 22 Years of Age", Circulation 2002; 105: 1088-1092.

Lucas, A., "Programming by Early Nutrition in Man: In: Bock, GR, Whelan J. Eds", CIBA Foundation Symposium 156. Chichester, UK Whiley; 1991: pp. 38-55.

Hales, C.N., "Fishing in the Stream of Diabetes: From Measuring Insulin to the Control of Fetal Organogenesis", Biochem. Soc. Trans 1996; 24: pp. 341-350.

Hahn, P., "Effect of Litter Size on Plasma Cholesterol and Insulin and Some Liver and Adipose Tissue Enzymes in Adult Rodents", J. Nutr. 1984; 114: pp. 1231-1234.

Barker, D.J.P., "Fetal Origins of Coronary Heart Disease", BMJ 311: pp. 171-174.

Leeson, C.P.M., et al., "Cardiovascular Risk Factors on Endothelial Function in Early Adult Life", Circulation 2001; 103: pp. 1264-1268.

McAllister, A.S., et al., "Relationship of Endothelial Function to Birth Weight in Humans", Diabetes Care 1999; 22: pp. 2061-2066.

Sorensen, K.E., et al., "Non-Invasive Measurement of Human Endothelium Dependent Arterial Responses: Accuracy and Reproducibility", Br. Heart J. 1995; 74: pp. 247-253.

Clarkson, P., et al., "Impaired Vascular Reactivity in Insulin-Dependent Diabetes Mellitus Is Related to Disease Duration and Low Density Lipoprotein Cholesterol Levels", j. am. coll. cardiol. 1996; 28: pp. 573-579.

Celermajer, D.S., et al., "Cigarette Smoking Is Associated With Dose-Related and Potentially Reversible Impairment of Endothelium-Dependent Dilation in Healthy Young Adults", Circulation 1993; 88: pp. 2149-2155.

Long, K.K., et al., "Size At Birth and Early Childhood Growth in Relation to Maternal Smoking, Parity and Infant Breast Feeding: Longitudinal Birth Cohort Study and Analysis", Pediatr. Res. 2002; 52: pp. 863-867.

Ross, R., "The Pathogenesis of Atherosclerosis: A Perspective for the 1990's", Nature 1993; 362: pp. 801-809.

Anderson, T.J., et al., Close Relation of Endothelial Function in the Human Coronary and Peripheral Circulations, J. Am. Coll. Cardio. 1995; 26: pp. 1235-1241.

Mullen, M.J., et al., "Non-Invasive Assessment of Endlthelial Function", Heart 1997; 4: 297-298.

Schachlinger, V., et al., "Prognostic Impact of Coronary Vasodilator Dysfunction on Adverse Long-Term Outcome of Coronary Heart Disease", Circulation 2000; 101: pp. 1899-1906.

Murakami, T., et al., "Long-Term Follow-Up for Cardivacsular Events After Non-Invasive Ultrasonic Evaluation for Vasomotor Dysfunction", Clin. Sci. 2000; 102: pp. 2404.

Martyn, C.N., et al., "Impaired Fetal Growth and Atherosclerosis of Carotid and Peripheral Arteries", Lancet 1998; 352: pp. 173-178.

Bayes-Genis, A., et al., "The Insulin-Like Growth Factor Axis: A Review of Atherosclerosis and Restenosis", Circ. Res. 2000; 86: pp. 125-130.

Martin, R.M., et al., "Infant Nutrition and Blood Pressure in Early Adulthood: The Barry Caerphilly Growth Cohort Study", Am. J. Clin. Nutr. 2003; 77: pp. 1489-1497.

Singhal, A., et al., "Breastmilk Feeding and Lipoprotein Profile in Adolescents Born Preterm: Follow-Up of a Prospective Randomised Study", Lancet 2004; 363: pp. 1571-1578.

Marmot, M.G., et al., "Effect of Breastfeeding on Plasma Cholesterol and Weight in Young Adults", J. Epidemiol. Comm. Health 1980; 34: pp. 164-167.

Ravelli, A.C.J., et al., "Infant Feeding and Adult Glucose Tolerance, Lipid Profile, Blood Pressure, and Obesity", Arch. Dis. Child 2000; 82: pp. 248-252.

Plancoulaine, S., et al., "Infant Feeding Patterns Are Related to Blood Cholesterol Concentration in Prepubertal Children Aged 5-11 YR: The Fleurbaix-Laventie Ville Sante Study", Eur. J. Clin. Nutr. 2000; 54: pp. 114-119.

Owen, C.G., et al., "Infant Feeding and Blood Cholesterol: A Study in Adolescents and a Systematic Review", Paediatrics 2002; 110: pp. 597-608.

Hodgson, P.A., et al., "Comparison of Serum Cholesterol in Children Fed High, Moderate, or Low Cholesterol Milk Diets During Neonatal Period", Metabolism 1976; 25: pp. 739-746.

Fomon, S.J., et al., "Indices of Fatness and Serum Cholesterol At Age Eight Years in Relation to Feeding and Growth During Early Infancy", Pediatr. Res. 1984; 18: pp. 1233-1238.

Hamosh, M., "Does Infant Nutrition Affect Adiposity and Cholesterol Levels in the Adult", J. Pediatr. Gastroenterol. Nutr 1988; 7: pp. 10-16.

McGill, N.C., et al., "Early Determinants of Adult Metabolic Regulation: Effects of Infant Nutrition on Adult Lipid and Lipoprotein Metabolism", Nutr. Rev. 1996; 54: pp. S31-S40.

Newman, W.P., et al., "Relation of Serum Lipoprotein Levels and Systolic Blood Pressure to Early Atherosclerosis: The Bogalusa Heart Study", N. Engh. J. Med. 1986; 314: pp. 138-144.

Castelli, R.D., et al., "Summary of Estimates of Cholesterol Used to Predict Coronary Heart Disease", Circulation 1983; 67: pp. 730-734.

Freedman, D.S., et al., "The Relation of Apoliproptein A-1 and B in Children to Parental Myocardial Infarction", N. Engl. J. Med. 1986; 315; pp. 721-726.

Walldius, G., et al., "High Apolipoprotein B, Low Apolipoprotein A-1 and Improvement in the Prediction of Fatal Myocardial Infarction (Amoris Study): A Prospective Study", Lancet 2001; 358: pp. 2026-2033.

Heinrich, J., et al., "Association of Variables of Coagulation, Fibrinolysis and Acute-Phase With Atherosclerosis in Coronary and Peripheral Arteries and Those Arteries Supplying the Brain", Thromb. Haemost. 1995; 73: pp. 374-379.

Libby, P., "Inflammation in Atherosclerosis", Nature 2002; 420: pp. 868-874.

Legrand, W.K., et al., "C-Reactive Protein As a Cardiovascular Risk Factor More Than an Epiphenomenon?", Circulation 1999; 100: pp. 96-102.

Mendall, M.A., et al., "C-Reactive Protein and Its Relation to Cardio-Vascular Risk Factors: A Population Based Cross-Sectional Study", BMJ 1996; 312: pp. 1061-1065.

Grundy, S.M., "Hypertriglyceridemia, Atherogenic Dyslipidemia, and the Metabolic Syndrome", Am. J. Cardiol. 1998; 81: pp. 18B-25B.

Friedewald, W.T., et al., "Estimation of the Concentration of Low-Density Lipoprotein Cholesterol in Plasma, Without Use of the Preparative Ultracentrifuge", Clin. Chem. 1972; 18: pp. 499-502.

Kark, J.D., et al., "Validity of Maternal Reporting of Breastfeeding History and the Association With Blood Lipids in 17 Year Olds in Jerusalem", J. Epidemiol. Comm. Health 1984; 38: pp. 218-225.

Kolacek, S., et al., "Cardiovascular Risk Factors in Adults. A Plasma Lipids", Acta Paediatr. 1993; 82: pp. 699-704.

Bergstrom, E., et al., "Serum Lipid Values in Adolescents Are Related to Family History, Infant Feeding, and Physical Growth", Atheroschlerosis 1995; 117: pp. 1-13.

Holme, I., "An Analysis of Randomized Trials Evaluation the Effect of Cholesterol Reduction on Total Mortality and Coronary Heart Disease Incidence", Circulatio 1990; 82: pp. 1916-1924.

Law, M.R., et al., "By How Much and How Quickly Does Reduction in Serum Cholesterol Concentration Lower Risk of Ischaemic Heart Disease?", BMJ 1994; 308; pp. 367-373.

Gould, A.L., et al., "Cholesterol Reduction Yields Clinical Benefit: A New Look At Old Data", Circulation 1995; 91(8); pp. 2274-2282.

Webbre, L.S., et al., "Tracking of Serum Lipids From Childhood to Adulthood: The Bogalusa Heart Study", Am. J. Epidemoil. 1991; 133: pp. 884-898.

Tang, J.L., et al., "Systemic Review of Dietary Intervention Trials to Lower Blood Cholesterol in Free-Living Subjects", BMJ 1998; 316: pp. 1213-1219.

Strabak, V., et al., "Search for Optimal Age for Weaning-Ten-Year Prospective Study". Endocrin. Regulations 1993; 27: pp. 215-221.

Finken, M.J.J., et al., "Early Catch Up Growth in Weight of Very Preterm Low Birth Weight Infants Is Associated With Higher Levels of LDL-Cholesterol and APO-B At Age 19", Ped. Res. 2003; 5: pp. 32a.

Mott, G.E., et al., "Preweaning Diet Programs Postweaning Plasma Thyrosine Concentrations in Baboons", Dietary Programming of Thyroid Hormones 1996; 212: pp. 342-348.

Singhal, A., et al., "Early Origins of Cardiovascular Disease: Is There a Unifying Hypothesis?", Lancet 2004; 363: pp. 1642-1645.

McCance, R.A., "Food, Growth and Time", Lancet 1962; 2: pp. 671-676.

Barker, D.J.P., et al., "Fetal Nutrition and Cardiovascular Disease in Adult Life", Lancet 1993; 341: pp. 938-941.

Frankel, S., et al., "Birth Weight Body-Mass Index in Middle Age and Incident of Coronary Heart Disease", Lancet 1996: 348: pp. 1478-1480.

Ounsted, M.K., et al., "Factors Associated With the Blood Pressure of Children Born to Women Who Were Hypertensive During Pregnancy", Arch. Dis. Child 1985; 60: pp. 631-635.

Forsen, T., et al., "The Fetal and Childhood Growth of Persons Who Develop Type 2 Diabetes", Am. Intern. Med 2000; 133: pp. 176-182.

Plagemann, A., et al., "Long-Term Impact of Neonatal Beast Feeding on Body Weight and Glucose Tolerance in Children of Diabetic Mothers", Diabetes Care 2002; 25: pp. 16-22.

Von Kries, R., et al., "Breast Feeding and Obesity; Cross-Sectional Study", BMJ 1999; 319: pp. 147-150.

Stern, M.P., "Do Non-Insulin Dependent Diabetes Mellitus and Cardiovascular Disease Share Common Antecedents?" Am Intern. Med. 1996; 124: pp. 110-116.

Victoria, C.G., et al., "Short-Term Benefits of Catch-Up Growth for Small Gestational Age Infants", Int. J. Epidemoil. 2001; 30: pp. 1325-1330.

Must, et al., The Disease Burden Associated With Overweight And Obesity, JAMA, vol. 282, No. 16, po. 1523-1529.

K.K. Ong, et al., Association Between Postnatal Catch-up Growth And Obesity in Childhood: prospective cohort study, BMJ, vol. 320, pp. 967-971 (2000).

A. Peeters, et al., Obesity in Adulthood And Its Consequences for Life Expectancy: A Life-Table Analysis, Annals of Internal Medician, vol. 138, No. 1., pp. 24-32 (2003).

T. Lakka, et al., Abdominal Obesity Is Associated With Accelerated Progression Of Carotid Atherosclorosis In Men, Atherosclerosis, vol. 154, pp. 497-504 (2001).

F. Pi-Sunyer, Medical Hazards of Obesity, Ann. Intern. Med., vol. 119, No. 7, Pt. 2, pp. 655-660 (1993).

M. Velasquez, et al., Leptin And Its Relation To Obesity And Insulin In The SHR/N-corpulent Rat, A Model Of Type II Diabetes Mellitus, Int. Jnl. Experimental Diab. Res., vol. 2, pp. 217-223 (2001).

N-F Chu, et al., Plasma Leptin Concentrations and Four-Year Weight Gain Among US Men, International Journal of Obesity, vol. 25, pp. 346-353 (2001).

Opposition of EP Patent No. 1 605 780 by Nestec S.A., mailed Feb. 17, 2010.

Office action from Canadian patent application No. 2,515,378, dated Aug. 12, 2010.

Office action from Ecuador patent application No. PCT-05-6008, dated Sep. 10, 2010.

Demmelmair, et al., "Long-term consequences of early nutrition," Early Human Development, vol. 82, No. 8, pp. 567-574 (Aug. 1, 2006).

Fomon, et al., "What is the safe protein-energy ratio for infant formulas?," Am. J. Clin. Nutr., vol. 62, No. 2, pp. 358-363 (Jan. 1, 1995).

International Search Report and Written Opinion for PCT/IB2009/055832 mailed Nov. 8, 2010.

* cited by examiner

NEWBORN INFANT FORMULAS AND FEEDING METHODS

CROSS-REFERENCE TO RELATED APPLICATIONS

This is a division of U.S. application Ser. No. 10/806,169, filed 23 Mar. 2004 which is a continuation-in-part of PCT/GB04/000518, filed Feb. 9, 2004, which claims priority from GB 0302929.5, filed 10 Feb. 2003; GB 0304482.3, filed 27 Feb. 2003; and GB 0318270.6, filed 5 Aug. 2003.

FIELD OF INVENTION

The present invention relates to infant formulas and methods for using the formulas in feeding newborn infants.

BACKGROUND OF THE INVENTION

There are many different infant nutritional formulas that are commercially available or otherwise known in the infant formula art. These infant formulas comprise a range of nutrients to meet the nutritional needs of the growing infant, and typically include lipids, carbohydrates, protein, vitamins. minerals, and other nutrients helpful for optimal infant growth and development.

Most of these nutritional infant formulas are designed to assimilate or duplicate the composition and function of human milk. It is generally recognized, however, that human milk is preferred over synthetic infant formulas for the feeding of infants. It is also known that human milk provides improved immunological benefits to the breastfed infant, as well as long-term benefits in the area of certain cognitive developments.

It is also well known that the composition of human milk changes over the first few weeks following delivery of an infant. Human milk is referred to as colostrum during the first 5 days after birth, transition milk during days 6-14 after birth, and mature milk thereafter, and during each stage of lactation, the corresponding human milk composition differs considerably. Colostrum and transition milk, for example, have lower caloric densities than mature milk, as well as higher protein and lower carbohydrate concentrations. Vitamin and mineral concentrations also vary in the three defined human milk groups.

Most commercial infant formulas are similar in composition, although not identical, to mature human milk, and are used in both newborns as well as older infants. It is generally believed that the nutrient composition and higher energy content of mature milk, and thus the nutrient composition and higher energy content of most commercial infant formulas, benefit newborn infants given the rapid growth rate of infants during the initial weeks of life. In short, it has heretofore been accepted that the feeding of newborn infants should be conducted with an emphasis on encouraging infant growth, and that such growth is best accomplished via the feeding with commercial infant formulas having a similar nutrient and energy content to mature human milk.

It has now been observed, however, that formula-fed newborn infants might benefit from a feeding having a lower energy density, and perhaps more importantly, from a feeding that provides fewer calories during the initial weeks or months of life than would otherwise be provided from a feeding with a conventional infant formula. We have found from our long term infant studies that rapid early growth, achieved in large part from nutrient enriched feedings from conventional infant formulas, may result in long-term adverse health effects in individuals later in life, particularly with regard to long-term vascular health relevant to the development of atherosclerosis and to the later propensity to insulin resistance and non-insulin dependent diabetes mellitus (NIDDM), while slower growth in newborn infants, achieved in large part from feeding human milk or formula with a modified carbohydrate, fat and protein calorie distribution (e.g., higher protein, lower caloric density), can have a beneficial effect in the form of reduced occurrence of markers of adult morbidity.

It was also observed in the infant studies described herein that formula fed infants had a greater weight gain during the initial weeks of life than breastfed infants, and so it could be that the suggested long-term beneficial effects of breast-feeding on cardiovascular health could be a consequence of the lower nutrient intake of breastfed infants during this critical early window, e.g., the initial weeks or months of life.

It is therefore an object of the present invention to provide an infant formula designed for newborn infants that provides for optimal nutrition of these children, especially during the initial weeks or months of life, including the first few weeks of life. It is a further object of the present invention to provide an infant formula having a nutrient composition designed for optimal long-term health benefits, especially as such a formula is directed to the newborn infant population. It is a further object of the present invention to provide a method for providing such nutrition to newborn infants, and further to provide a method of reducing the occurrence or extent of insulin resistance later in the life of those infants, and further to provide a method of reducing the occurrence of atherosclerosis or coronary artery disease in those infants later in life, wherein all such methods are directed to the use of the newborn infant formulas of the present invention.

These and other objectives of the present invention are described hereinafter in greater detail.

SUMMARY OF THE INVENTION

The present invention is directed to newborn infant formulas comprising fat, carbohydrate, and from about 0.5 to about 2.5 g of protein per 100 ml of formula, wherein the formula has a caloric density of from about 25 to about 50 kcal per 100 ml of formula.

The present invention is also directed to newborn infant formulas having a caloric density of from about 25 to about 50 kcal per 100 ml of formula, said formula comprising fat, carbohydrate, and from about 0.5 to 2.5 g of protein per 100 ml of formula, wherein the protein represents from about 4 to about 40% of the total calories and the carbohydrate represents less than about 40% of the total calories, in the formula.

The present invention is also directed to a method of providing nutrition to newborn infants, said method comprising the administration of the newborn infant formulas of the present invention to newborn infants during the first three months of life, preferably during at least about the first few weeks of life.

The present invention is also directed to a method of providing long-term health benefits in individuals by feeding methods directed to those individuals as newborn infants. These methods include a method of reducing the occurrence or extent of insulin resistance in an individual later in life, said method comprising the administration to an individual as a newborn infant the newborn infant formula of the present invention. These methods also include a method of reducing the occurrence or extent of atherosclerosis or coronary artery disease in an individual later in life, said method comprising the administration to an individual as a newborn infant the newborn infant formula of the present invention.

The present invention is based upon an observed relationship between feeding and growth rates among newborn infants and certain biochemical markers suggestive of long-term health effects of those infants later in life. In particular, it has been observed that rapid growth rates of newborn infants appear to correlate with certain biochemical markers that are suggestive of an increased potential development of long-term adverse health effects in those infants later in life such as atherosclerosis or coronary artery disease and insulin resistance or non-insulin dependent diabetes. It now appears that a more controlled growth rate of newborn infants may result in long term health benefits. These controlled growth rates are made possible by administration of the infant formulas of the present invention in accordance with the corresponding methods described herein.

The infant feeding formula of the present invention may include those compositions comprising from 0.5 to 1.00 grams of protein per 100 ml of formula and 25 to 50 kilocalories per 100 ml of formula. These compositions include those in which the protein component is selected from bovine caseins, whey proteins and individual proteins thereof, alpha-casein, P-lactoglobulin, serum albumin, lactoferrin, immunoglobulins and combinations of these proteins and also mixtures with other proteins. In these embodiments, the infant feeding formulas may contain energy in the form of carbohydrate and fat. The present invention is also directed to a liquid infant feeding formula which comprises water and the above-described infant feeding formula.

The infant formulas and methods of the present invention are therefore directed to the formulation and administration of defined protein concentrations/amounts and energy content, for example the formulation and use of an infant formula comprising per 100 ml of said formula, from 0.5 to 2.5 grams of protein and from 25 to 50 kcals of energy. This particular combination of protein and energy is much different than that found in conventional term and preterm infant formulas. Unlike conventional infant formulas, the newborn infant formulas of the present invention comprise lower energy densities and a higher relative amount of protein, with a preferred reduction in relative concentration/amount of carbohydrate.

DETAILED DESCRIPTION OF THE INVENTION

The newborn infant formula and methods of the present invention are directed to the formulation and use of defined amounts of macronutrients, i.e., protein, carbohydrate, and fat, and energy in newborn infants. These and other essential or optional characteristics or components of the formulation and methods of the present invention are described in greater detail hereinafter.

The term "newborn infant" as used herein, unless otherwise specified, means term infants less than about 3 months of age, including infants from zero to about 2 weeks of age. As used herein, a "term infant" refers to individuals born at or beyond 37 weeks gestation, unless otherwise specified.

The terms "fat" and "lipid" are used interchangeably herein, and unless otherwise specified, refer generally to fats, oils, and combinations thereof.

The terms "infant formula" and "nutritional formula" are used interchangeably herein and refer to nutritional compositions designed for infants, which preferably contain sufficient protein, carbohydrate, lipid, vitamins, minerals, and electrolytes to potentially serve as the sole source of nutrition when provided in sufficient quantities. These terms refer to synthetic nutritional formulas and therefore specifically exclude human milk, cows milk, or any other natural whole milk product, except when such natural whole milk product is modified by manufacturing processes to form a modified milk product, e.g., milk-based infant formula.

All percentages, parts and ratios as used herein are by weight of the total composition, unless otherwise specified. All such weights as they pertain to listed ingredients are based upon the active level and, therefore, do not include solvents or by-products that may be included in commercially available materials, unless otherwise specified.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, 5, 6, from 1 to 9, from 3.6 to 4.6, from 3.5 to 9.9, and so forth.

Numerical ranges as used herein are also intended to include the term "about" to modify the numerical end points of each range.

All references to singular characteristics or limitations of the present invention shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The compositions and methods of the present invention can comprise, consist of, or consist essentially of the essential elements and limitations of the invention described herein, as well as any additional or optional ingredients, components, or limitations described herein or otherwise useful in nutritional infant formula applications.

Energy

The newborn infant formulas of the present invention have low energy content relative to conventional term and preterm infant formulas, wherein these newborn infant formulas comprise or otherwise provide a caloric density of from about 25 to about 50 kcal per 100 ml, including from about 35 to about 45 kcal per 100 ml, also including from about 37 to about 42 kcal per 100 ml. The caloric density of the newborn infant formulas of the present invention are easily distinguished from that of conventional term and preterm infant formulas, wherein such conventional formulas typically have a caloric density or energy content of from 66 to 88 kcal per 100 ml (i.e., 19-25 kcal/fl oz.

When the newborn infant formulas of the present invention are in powder form, then the powder is intended for reconstitution prior to use to obtain the above-noted caloric densities and other nutrient requirements. Likewise, when the infant formulas of the present invention are in a concentrated liquid form, then the concentrate is intended for dilution prior to use to obtain the requisite caloric densities and nutrient requirements. The newborn infant formulas can also be formulated as ready-to-feed liquids already having the requisite caloric densities and nutrient requirements.

The newborn infant formulas of the present invention are preferably administered to newborn infants in accordance with the methods described herein. Such methods may include feedings with the newborn infant formulas in accordance with the daily formula intake volumes described hereinafter.

The energy component of the newborn infant formula is most typically provided by a combination of fat, protein, and carbohydrate nutrients. The protein may comprise from about 4 to about 40% of the total calories, including from about 10 to about 30%, also including from about 15 to about 25%; the carbohydrate may comprise less than 40% of the total calories, including from about 5 to about 37%, also including less than about 36%, and also including from about 20 to about 33%: and the fat may comprise the remainder of the formula calories, most typically less than about 60% of the calories, including from about 30 to about 60%.

Each of the fat, protein, and carbohydrate nutrient components is described hereinafter in greater detail.

Protein

The newborn infant formulas of the present invention comprise protein in the requisite amounts as described hereinbefore relative to the total energy content of the formula. Any known or otherwise suitable protein or protein source may be used in the newborn infant formulas of the present invention, provided that such proteins are suitable for feeding infants, especially newborn infants.

The newborn infant formulas of the present invention may typically comprise or otherwise provide from about 0.5 to about 2.5 g, including from about 0.5 g to about 1.0 g, and also from about 1.0 to about 2.5 g, also including from about 1.5 to about 2.2 g, of protein per 100 ml of formula. The protein component of the formulas may therefore represent from about 4 to about 40%, including from about 10 to about 30%, also including from about 15 to about 25%, of the total calories in the newborn infant formulas.

Proteins or protein sources for use in the infant formulas of the present invention may include intact or non-hydrolyzed protein, hydrolyzed protein, partially hydrolyzed protein, free amino acids, and combinations thereof, which protein or protein source may be derived from any known or otherwise suitable source such as milk (e.g., casein, whey, milk protein isolates), animal (e.g., meat, fish), cereal (e.g., rice, corn), vegetable (e.g., soy), or combinations thereof. The protein can include, or be entirely or partially replaced by, free amino acids which are known or otherwise suitable for use in nutritional products, non-limiting examples of which include L-alanine. L-arginine. L-asparagine. L-aspartic acid, L-carnitine, L-cystine. L-glutamic acid, L-glutamine, glycine. L-histidine, L-isoleucine, L-leucine. L-lysine, L-methionine, L-phenylalanine, L-proline. L-serine. L-taurine. L-threonine, L-tryptophan. L-tyrosine, L-valine, and combinations thereof.

Other Nutrients

The newborn infant formulas of the present invention comprise fat and carbohydrate nutrients in addition to the protein nutrients described hereinbefore, and preferably further comprise still other nutrients such as vitamins, minerals, and combinations thereof, of sufficient types and amounts to help meet the special nutritional needs of the newborn infant. The newborn infant formulas may be used as the sole source of nutrition during the initial weeks or months of life, and can be used in combination with human milk during that same period.

Many different sources and types of carbohydrates, lipids, proteins, minerals and vitamins are known and can be used in the infant formulas and methods of the present invention, provided that such nutrients are compatible with the added ingredients in the selected formulation, are safe and effective for their intended use, and do not otherwise unduly impair product performance.

The newborn infant formulas comprise a fat or lipid component, the amount of which may represent less than about 60%, including from about 30 to about 60%, of the total calories in the formula. Non-limiting examples of fats suitable for use in the newborn infant formulas include coconut oil, soy oil, corn oil, olive oil, safflower oil, high oleic safflower oil, MCT oil (medium chain triglycerides), sunflower oil, high oleic sunflower oil, structured triglycerides, palm and palm kernel oils, palm olein, canola oil, marine oils, cottonseed oils, and combinations thereof.

Still other suitable fats or related materials include those that provide specific fatty acids, including arachidonic acid, docosahexaenoic acid, and mixtures thereof. These materials are known to provide beneficial effects in infants such as enhanced brain and vision development, descriptions of which are set forth in U.S. Pat. No. 5,492,938 (Kyle et al.), which descriptions are incorporated herein by reference. Non-limiting sources of arachidonic acid and docosahexaenoic acid include marine oil, egg derived oils, fungal oil, algal oil, and combinations thereof. Eicosapentoic acid (EPA) can also be added to the infant formula.

The newborn infant formulas of the present invention also comprise carbohydrates, the amount of which may represent less than about 40%, including from about 5 to about 37%, also including less than about 36%, and also including from about 20 to about 33%, of the total calories in the formulas.

Non-limiting examples of suitable carbohydrates or carbohydrate sources include hydrolyzed or intact, naturally and/or chemically modified, starches sourced from corn, tapioca, rice or potato, in waxy or non-waxy forms. Other non-limiting examples of suitable carbohydrates or carbohydrate sources include hydrolyzed cornstarch, maltodextrin (i.e. non-sweet, nutritive polysaccharide having a DE value less than 20), glucose polymers, sucrose, corn syrup, corn syrup solids (i.e., polysaccharide having a DE value greater than 20), glucose, rice syrup, fructose, high fructose corn syrup, indigestible oligosaccharides such as fructooligosaccharides (FOS), and combinations thereof. The carbohydrates can comprise lactose or can be substantially free of lactose.

The newborn infant formulas may further comprise any of a variety of vitamins, non-limiting examples of which include vitamin A, vitamin D, vitamin E, vitamin K, thiamine, riboflavin, pyridoxine, vitamin $B_{12}$, niacin, folic acid, pantothenic acid, biotin, vitamin C, choline, inositol, salts and derivatives thereof, and combinations thereof.

The newborn infant formulas also include those embodiments that comprise per 100 kcal of formula one or more of the following: vitamin A (from about 400 to about 2000 IU), vitamin D (from about 40 to about 100 IU), vitamin K (greater than about 4 μg), vitamin E (at least about 1.0 IU), vitamin C (at least about 8 mg), thiamine (at least about 50 μg), vitamin $B_{12}$ (at least about 0.15 μg), niacin (at least about 300 μg), folic acid (at least about 8 μg), pantothenic acid (at least about 400 μg), biotin (at least about 3 μg), choline (at least about 7 mg), and inositol (at least about 2 mg).

The newborn infant formulas may further comprise any of a variety of minerals known or otherwise suitable for us in infant nutrition formulas, non-limiting examples of which include calcium, phosphorus, magnesium, iron, zinc, manganese, copper, iodine, sodium, potassium, chloride, selenium, and combinations thereof.

The newborn infant formulas also include those embodiments containing per 100 kcal of formula one or more of the following: calcium (at least about 50 mg), phosphorus (at least about 25 mg), magnesium (at least about 6 mg), iron (at least about 0.15 mg), iodine (at least about 5 µg), zinc (at least about 0.5 mg), copper (at least about 60 µg), manganese (at least about 5 µg), sodium (from about 20 to about 60 mg), potassium (from about 80 to about 200 mg), chloride (from about 55 to about 150 mg) and selenium (at least about 0.5 µg).

Product Form

The newborn infant formulas of the present invention can be prepared in any of a variety of product forms, but will most typically be in the form of a ready-to-feed liquid, a liquid concentrate for dilution prior to consumption, or a powder that is reconstituted prior to consumption.

The newborn infant formulas of the present invention can therefore include ready-to-feed formulas that comprise the requisite nutrient and energy requirements, or product forms that can otherwise provide for such requirements upon reconstitution or dilution prior to use.

Method of Use

The present invention is also directed to a method of providing nutrition to a newborn infant, said method comprising the administration or feeding to a newborn infant the newborn infant formula of the present invention. Such methods include the daily administration of the newborn infant formulas, including administration at the daily intake volumes and relative daily macronutrient intakes, as described hereinbefore.

Such methods therefore include the daily administration to a newborn infant a formula having a caloric density of from about 25 to 50 kcal per 100 ml. including from about 35 to about 45 kcal per 100 ml, also including from about 37.5 kcal per 100 ml to about 42.5 kcal per 100 ml.

The methods of the present invention may further comprise average feeding volumes as described herein, wherein the newborn infants are provided increasing formula volumes during the initial weeks of life. Such volumes most typically range up to about 100 ml/day on average during the first day or so of life; up to about 200 to about 700 ml/day, including from about 200 to about 600 ml/day, and also including from about 250 to 500 ml/day, on average during the first two weeks; and thereafter up to about 1100 ml/day, including from about 600 to about 1100 ml/day, and also including from about 800 to about 1000 ml/day, on average during the remainder of the 3 month newborn feeding period. It is understood, however, that such volumes can vary considerably depending upon the particular newborn infant and their unique nutritional needs during the initial weeks or months of life, as well as the specific nutrients and caloric density of the formulated newborn infant formula.

Such methods may therefore also provide the infants with optimal daily amounts of protein, carbohydrate, and lipids, such that the protein represents at least about 4% of the total daily calories, including from about 10% to about 40%, also including from about 15% to about 25%; the carbohydrate represents less than 40% of the total calories, including less than about 36%, and also including from about 20% to about 33%; and the fat represents the most or all of the remainder of the formula calories, most typically less than about 60% of the calories, including from about 30 to about 60%, of the calories.

The methods of the present invention preferably involve average daily feeding volumes and caloric intake similar to that of breastfed infants during the initial weeks or months of life.

The methods of the present invention are directed to newborn infants during the initial weeks or months of life, preferably during at least the first week of life, more preferably during at least the first two weeks of life, and including up to about 3 months of life. Thereafter, the infant is preferably switched to a conventional infant formula, alone or in combination with human milk.

The present invention is also directed to a method of reducing the extent or occurrence of insulin resistance in an individual later in life, said method comprising the administration to an individual as a newborn infant the newborn infant formula described herein, all in accordance with the above-described method. In the context of the present invention, the term "later in life" refers to the phase in an individuals life beyond the newborn infant stage, including the period beginning thereafter, and also including the period from about 9 years to 14 years of age, and also including the period from about 14 years to about 18 years of age, and also including the adult phase at and beyond 18 years of life.

The present invention is also directed to a method of reducing the extent or occurrence of atherosclerosis or coronary artery disease in an individual later in life, said method comprising the administration to an individual as a newborn infant the newborn infant formula described herein, all in accordance with the above-described methods.

In the context of the methods of the present invention as applied to newborn infant formulas in powder form, the corresponding method may further comprise reconstituting the powder with an aqueous vehicle, most typically water or human milk, to form the desired caloric density, which is then orally or enterally fed to the newborn infant to provide the desired nutrition. For powdered newborn infant formula embodiments of the present invention, each is reconstituted with a sufficient quantity of water or other suitable fluid such as human milk to produce the desired caloric density, as well as the desired feeding volume suitable for one infant feeding.

Optional Ingredients

The newborn infant formulas of the present invention may further comprise other optional ingredients or characteristics that may modify the physical, chemical, aesthetic or processing characteristics of the formulas or serve as pharmaceutical or additional nutritional components when used in the newborn infant population. Many such optional ingredients are known for use in food and nutritional products, including infant formulas, and may also be used in the newborn infant formulas for use in the method of the present invention, provided that such optional materials are compatible with the essential materials described herein, are safe and effective for their intended use, and do not otherwise unduly impair product performance as described herein.

Non-limiting examples of such optional ingredients include preservatives, anti-oxidants, emulsifying agents, buffers, colorants, flavors, nucleotides and nucleosides, thickening agents, fiber, stabilizers, prebiotics, probiotics, and so forth.

Method of Manufacture

The newborn infant formulas of the present invention may be prepared by any known or otherwise effective technique suitable for making and formulating infant or similar other nutritional formulas. Many such methods are described in the relevant arts or are otherwise well known to those skilled in the nutrition formula art, and are easily reapplied by one of ordinary skill in the formulation arts to the newborn infant formulas of the present invention.

The newborn infant formulas of the present invention, including the exemplified formulas described hereinafter, can be prepared by any of a variety of known or otherwise effective methods. These methods most typically involve the initial formation of an aqueous slurry containing carbohydrates, proteins, lipids, stabilizers or other formulation aids, vitamins, minerals, or combinations thereof. The slurry is emulsified, pasteurized, homogenized, and cooled. Various other solutions, mixtures, or other materials may be added to the resulting emulsion before, during, or after further processing. This emulsion can then be further diluted, heat-treated, and packaged to form a ready-to-feed or concentrated liquid, or it can be heat-treated and subsequently processed and packaged as a reconstitutable powder, e.g., spray dried, dry mixed, agglomerated.

Other methods for making infant nutrition formulas are described, for example, in U.S. Pat. No. 6,365,218 (Borschel), which description is incorporated herein by reference.

EXAMPLES

The following examples illustrate specific embodiments of the newborn infant formula and corresponding methods of the present invention. The examples are given solely for the purpose of illustration and are not to be construed as limitations of the present invention, as many variations thereof are possible without departing from the spirit and scope of the invention. The exemplified products are prepared in three different product forms: ready-to-feed liquid, liquid concentrate, and powder.

Each product form is further characterized by a nutrient profile similar to the target profile as set forth in the following Nutrient Profile table.

| Nutrient Profile: Newborn Infant formula | | |
|---|---|---|
| | Nutrients per 100 kcal of newborn infant formula | Nutrients per liter of newborn infant formula [1] |
| Energy kcal | 100 | 398 |
| Protein (g) | 5 | 20 |
| Lipid (g) | 5.5 | 22 |
| Carbohydrate | 8 g | 30 |
| Volume | 251 | 1000 |
| Vitamins | | |
| A (IU) | 700 | 2789 |
| D (IU) | 60 | 239 |
| E (IU) | 2 | 8 |
| K (μg) | 8 | 32 |
| Thiamine (μg) | 100 | 398 |
| Niacin (μg) | 500 | 1992 |
| Riboflavin (μg) | 100 | 398 |
| B5 (μg) | 450 | 1793 |
| B6 (μg) | 60 | 239 |
| B12 (μg) | 0.25 | 1 |
| Folate (μg) | 15 | 60 |
| Biotin (μg) | 4.4 | 17.5 |
| Ascorbic Acid (mg) | 10 | 40 |
| Minerals | | |
| Calcium (mg) | 150 | 600 |
| Phosphorus (mg) | 151 | 300 |
| Magnesium (mg) | 10 | 40 |
| Iron (mg) | 3.0 | 12 |
| Zinc (mg) | 1.8 | 7.0 |
| Manganese (μg) | 7.5 | 30 |
| Copper (μg) | 176 | 700 |
| Iodine (μg) | 10 | 41 |
| Sodium (mg) | 50 | 200 |
| Potassium (mg) | 178 | 710 |
| Chloride (mg) | 126 | 500 |
| Selenium (μg) | 5.0 | 20 |

[1] Concentration prior to use as ready-to-feed liquid, diluted liquid concentrate, or reconstituted powder The exemplified formulas of the present invention are prepared by conventional manufacturing methods, using conventional fat (e.g., blend of high oleic sunflower, coconut and soy oil), carbohydrate (e.g., blend of lactose, maltodextrin, and corn syrup), protein (e.g., milk protein isolate or soy protein isolate), minerals, vitamins. and other common ingredients, to achieve the targeted nutrition profile.

One such formula in liquid form includes the following ingredients, formulated by conventional methods for making liquid infant formulas, and modified again by conventional methods, to provide the fat, protein, and energy profile of the above-described Nutrient Profile table: water, nonfat milk, corn syrup solids, lactose, medium-chain triglycerides, whey protein concentrate, soy oil, coconut oil; C. cohnii oil, M. alpina oil, calcium phosphate, ascorbic acid, potassium citrate, magnesium chloride, sodium citrate, soy lecithin, mono- and diglycerides, carrageenan, calcium carbonate, choline bitartrate, m-inositol, taurine, niacinamide, choline chloride, alpha-tocopheryl acetate, L-carnitine, zinc sulfate, calcium pantothenate, potassium chloride, ferrous sulfate, vitamin A palmitate, cupric sulfate, riboflavin, thiamine chloride hydrochloride, pyridoxine hydrochloride, folic acid, beta-carotene, manganese sulfate, biotin, phylloquinone, sodium selenate, vitamin D3, cyanocobalamin, and nucleotides (cytidine 5'-monophosphate, disodium guanosine 5'-monophosphate, disodium uridine 5'-monophosphate, adenosine 5'-monophosphate).

Another such formula in concentrated liquid form includes the following ingredients, formulated by conventional methods for making concentrated liquid infant formulas, and modified again by conventional methods, to provide prior to use the fat, protein, and energy profile of the above-described Nutrient Profile: water, corn syrup, soy protein isolate, high-oleic safflower oil, sugar (sucrose), soy oil, coconut oil, starch; C. cohnii oil, M. alpina oil, calcium phosphate, potassium citrate, potassium chloride, mono- and diglycerides, soy lecithin, magnesium chloride, carrageenan, sodium chloride, ascorbic acid, choline chloride, L-methionine, taurine, ferrous sulfate, m-inositol, zinc sulfate, alpha-tocopheryl acetate, L-carnitine, niacinamide, calcium pantothenate, cupric sulfate, thiamine, chloride hydrochloride, beta-carotene, vitamin A palmitate, riboflavin, pyridoxine hydrochloride, folic acid, potassium iodide, phylloquinone, biotin, sodium selenate, vitamin D3 and cyanocobalamin.

Yet another such formula in ready-to-feed liquid form includes the following ingredients, formulated by conventional methods for making liquid infant formulas, and modified again by conventional methods, to provide prior to use the fat, protein, and energy profile of the above-described Nutrient Profile: water, corn syrup, soy protein isolate, high-oleic safflower oil, sugar (sucrose), soy oil, coconut oil; C. cohnii oil, M. alpina oil, calcium citrate, potassium citrate, calcium phosphate, potassium phosphate, potassium chloride, mono- and diglycerides, soy lecithin, magnesium chloride, carrageenan, sodium chloride, ascorbic acid, choline chloride, L-methionine, taurine, ferrous sulfate, m-inositol, zinc sulfate, alpha-tocopheryl acetate, L-carnitine, niacinamide, calcium pantothenate, cupric sulfate, thiamine chloride hydrochloride, beta-carotene, vitamin A palmitate, riboflavin, pyridoxine hydrochloride, folic acid, potassium iodide, phylloquinone, biotin, sodium selenate, vitamin D3 and cyanocobalamin.

And yet another such formula in powder form includes the following ingredients, formulated by conventional methods for making powder infant formulas, and modified again by conventional methods, to provide prior to use the fat, protein, and energy profile of the above-described Nutrient Profile: corn syrup solids, soy protein isolate, high-oleic safflower oil, sugar (sucrose), soy oil, coconut oil, C. cohnii oil. M. alpina oil, calcium phosphate, potassium citrate, soy lecithin, potassium chloride, magnesium chloride, sodium chloride, ascorbic acid, choline chloride, L-methionine, taurine, ascorbyl palmitate, ferrous sulfate, m-inositol, mixed tocopherols, zinc sulfate, alpha-tocopheryl acetate, L-carnitine, niacinamide, calcium pantothenate, cupric sulfate, thiamine chloride hydrochloride, vitamin A palmitate, riboflavin, pyridoxine hydrochloride, folic acid, potassium iodide, phylloquinone, biotin, sodium selenate, beta-carotene, vitamin D3 and cyanocobalamin.

Another exemplified formula in a ready-to-feed liquid form includes the following ingredients, formulated by conventional methods for making liquid infant formulas, and modified again by conventional methods, to provide prior to use the fat, protein, and energy profile of the above-described Nutrient Profile: water, nonfat milk, lactose, high-oleic safflower oil, soy oil, coconut oil, whey protein concentrate, C. cohnii oil, M. alpina oil, potassium citrate, calcium carbonate, ascorbic acid, mono- and diglycerides, soy lecithin, carrageenan, potassium chloride, magnesium chloride, sodium chloride, ferrous sulfate, choline chloride, choline bitartrate, taurine, m-inositol, alpha-tocopheryl acetate, L-carnitine, zinc sulfate, niacinamide, calcium pantothenate, riboflavin, vitamin A palmitate, cupric sulfate, thiamine chloride hydrochloride, pyridoxine hydrochloride, beta-carotene, folic acid, manganese sulfate, phylloquinone, biotin, sodium selenate, vitamin D3, cyanocobalamin and nucleotides (adenosine 5'-monophosphate, cytidine 5'-monophosphate, disodium guanosine 5'-monophosphate, disodium uridine 5'-monophosphate).

Another exemplified formula in a concentrated liquid form includes the following ingredients, formulated by conventional methods for making concentrated liquid infant formulas, and modified again by conventional methods, to provide prior to use the fat, protein, and energy profile of the above-described Nutrient Profile: water, nonfat milk, lactose, high-oleic safflower oil, soy oil, coconut oil, whey protein concentrate, C. cohnii oil, M. alpina oil, potassium citrate, calcium carbonate, ascorbic acid, mono- and diglycerides, soy lecithin, carrageenan, potassium chloride, choline bitartrate, magnesium chloride, choline chloride, sodium chloride, ferrous sulfate, taurine, m-inositol, alpha-tocopheryl acetate, L-carnitine, zinc sulfate, niacinamide, riboflavin, calcium pantothenate, cupric sulfate, vitamin A palmitate, thiamine chloride hydrochloride, pyridoxine hydrochloride, beta-carotene, folic acid, manganese sulfate, phylloquinone, biotin, sodium selenate, vitamin D3, cyanocobalamin and nucleotides (adenosine 5'-monophosphate, cytidine 5'-monophosphate, disodium guanosine 5'-monophosphate, disodium uridine 5'-monophosphate).

Another such formula in powder form includes the following ingredients, formulated by conventional methods for making powder formulas, and modified again by conventional methods, to provide prior to use the fat, protein, and energy profile of the above-described Nutrient Profile: nonfat milk, lactose, high-oleic safflower oil, soy oil, coconut oil, whey protein concentrate; C. cohnii oil, M. alpina oil, potassium citrate, calcium carbonate, ascorbic acid, potassium chloride, choline bitartrate, magnesium chloride, choline chloride, ferrous sulfate, ascorbyl palmitate, taurine, m-inositol, alpha-tocopheryl acetate. L-carnitine, mixed tocopherols, sodium chloride, zinc sulfate, niacinamide, calcium pantothenate, cupric sulfate, vitamin A palmitate, thiamine chloride hydrochloride, riboflavin, pyridoxine hydrochloride, beta-carotene, folic acid, manganese sulfate, phylloquinone, biotin, sodium selenate, vitamin D3, cyanocobalamin and nucleotides (adenosine 5'-monophosphate, cytidine 5'-monophosphate, disodium guanosine 5'-monophosphate, disodium uridine 5'-monophosphate.

In the exemplified formulas described above, the combination of C. cohnii oil and M. alpina oil provides each formula with a source of docosahexaenoic acid (DHA) and arachidonic acid (ARA).

Each of the exemplified formulas is then fed to newborn infants, or otherwise diluted or reconstituted prior to such feeding, in accordance with the methods of the present invention, wherein such feeding is administered by a conventional infant formula bottle at a daily average volume of from about a 200 ml/day to about 700 ml/day on average during the first two weeks of life, and from 600 to about 100 ml/day on average during the remaining first 3 months of life, and wherein the daily feeding provides the infants with optimal nutrition, and further provides for a reduction in the occurrence or extent of insulin resistance, a reduction in the occurrence or extent of atherosclerosis or coronary artery disease, or both, in those individuals later in life.

Clinical Study

The compositions and methods of the present invention are based primarily upon the findings of a clinical study directed toward infant feedings and the subsequent clinical evaluation of those infants several years later. A brief description of the study is described hereinafter.

Study 1

Subjects were part of a cohort of 926 who were born preterm and participated in studies that investigated the effects of early diet on later cognitive function and cardiovascular disease. Between 1982 and 1985, babies free from major congenital anomalies and below 1850 g in birth weight were recruited in 5 centres (Norwich, Cambridge, Sheffield, Ipswich and King's Lynn). A reference group of subjects of the same age, but born at term and with birth weight above the 10th percentile, was also recruited from schools in the same communities as those born preterm.

Infants born preterm were randomly assigned, in two parallel-randomized trials, to different diets at birth. These trials compared a nutrient enriched preterm formula (Farley's Osterprem, Farley's Health Care, a division of HJ Heinz Company, Ltd, Stockley Park, Uxbridge, UK) versus the relatively low nutrient diets available at the time. In Trial 1, the preterm formula was compared versus banked breast milk donated by unrelated lactating women and in Trial 2 the same preterm formula was compared against a standard term formula (Farley's OsterTnilk).

Within each trial (Trials 1 and 2) the diets were randomly assigned in two strata; A) the trial as diets alone and B) in mothers who elected to express their own milk, the trial diets were assigned as supplements to mother's milk (see Table 1). To compare the nutrient enriched preterm formula versus the lower nutrient diets, as originally planned, Trials 1 and 2 (and strata A and B within each trial) have been combined as a balanced addition, thereby preserving randomization. Random assignment to diets occurred within 48 hours of birth using sealed envelopes. Ethical approval for the trial was obtained from each centre and informed consent obtained from each parent (no parent refused consent).

The assigned diets were given until the infant weighed 2000 g or was discharged home. Compared with standard term formula, preterm formula was enriched in protein and fat (2.0 g protein and 4.9 g fat per 100 ml preterm formula compared to 1.5 g protein and 3.8 g fat per 100 ml of term formula) but not carbohydrate (7.0 g per 100 ml) in both formulas. Preterm formula was also enriched in vitamins, zinc and copper. For infants fed banked donated milk, protein and energy intakes were estimated from 600 donor milk pools collected from multiple donors (approximately 1.1 g protein, 2 g fat and 7 g carbohydrate per 100 ml). Mother's own expressed milk composition was measured in 4935 complete 24-hour collections (approximately 1.5 g protein, 3 g fat, and 7 g carbohydrate).

Extensive demographic, social, anthropometric, biochemical and clinical data were collected throughout the hospital admission. Infants were weighed daily by trained staff and a mean weight for each week post-natally was calculated to reduce inaccuracies arising from daily fluctuations in weight. Weights were also available at discharge from the neonatal unit, at age 18 months, 9-12 years and 13-16 years. Social class was based on the occupation of the parent providing the main financial support for the family (or if both parents worked the father's occupation) according to the Registrar Generals Classification as described.

Follow-Up

The present follow-up at 13-16 years of age involved measurement of four key variables (blood pressure, flow-mediated endothelial dependent dilation, lipid profile and 32-33 split insulin concentrations—as a measure of insulin resistance—see Study 2). Sample size was estimated to exclude a half standard deviation (0.5 D) difference in outcomes between randomized dietary groups in each of the two trials. We required a maximum sub-sample of around 250 subjects from our original cohort to detect this difference (with two parallel trials) at 80% power and 5% significance; and a minimum sample of around 200 subjects for 70% power and 5% significance.

FMD Measurement

We measured brachial artery Flow-Mediated endothelial dependent Dilation (FMD), an indicator of endothelial dysfunction relevant to the atherosclerotic process in a population subject to neonatal under nutrition and in healthy controls. This was determined by researchers who were unaware of the subject's gestational age. Subjects were rested supine for 10 minutes prior to the ultrasound scan, which was conducted by a single observer in a temperature controlled (22-24° C.), darkened room, between 0900 (a.m.) and 1300 (p.m.). The brachial artery was imaged in longitudinal section, 5-10 cm above the elbow, using a 7 MHz linear array transducer and an Acuson 128XP/10 system. The transducer was then fixed using a stereotactic clamp and fine position adjustments made when necessary using micrometer screws. A pneumatic cuff was inflated around the forearm to 300 mm Hg for 5 minutes followed by rapid deflation causing a large increase in blood flow (reactive hyperemia). The resting and post-hyperemic blood flow velocities in the centre of the imaged artery were determined using pulsed Doppler. End diastolic B-mode images were digitized and stored off-line sequentially every 3 seconds throughout the scan procedure for arterial diameter measurements immediately after the scan procedure (for 1 minute resting, 5 minutes cuff inflation, and 3 minutes post cuff deflation). Blood pressure was monitored using an automated oscillometric device (Accutorr, Datascope Corp., New Jersey, USA) and heart rate recorded using a three-lead electrocardiogram (ECG) linked to the ultrasound machine. The reproducibility and detailed methodology for measuring FMD has been previously described. FMD was expressed as the absolute maximal change between pre- and post-hyperemic brachial artery diameter adjusted for pre-hyperemic diameter (using regression analysis) and as the absolute change in diameter expressed as a percentage of pre-hyperemic diameter (FMD %).

Anthropometry and Biochemistry at Follow-Up

Height was measured using a portable stadiometer accurate to 1 mm (Holtain Instruments Ltd., Crymmych, UK) and weight using electronic scales accurate to 0.1 kg (Seca, Hamburg, Germany). Measurements were made using standard protocols by one of two observers trained in the techniques involved. Tanner staging was performed in private by self-assessment using standard Tanner stage photographs. Social class was based on the occupation of the parent providing the main financial support for the family (or if both parents worked the father's occupation) according to the Registrar General's Classification.

Blood was obtained by venopuncture between 0900 and 1100 a.m. after an overnight fast. Plasma was separated immediately, stored initially at −20° C. and then at −80° C., and thawed only once immediately before analysis. Plasma concentrations of LDL cholesterol were determined using standard laboratory methods.

Statistical Analysis

Multiple linear regression analyses were used to assess associations between the rate of neonatal and childhood growth (weight gain) and later FMD. Neonatal weight gain was expressed as the absolute value and as the standard deviation score from expected weight (z score) using percentiles for infants born preterm. Growth beyond the neonatal period was calculated as the change in z score for weight between discharge and age 18 months, 18 months and 9-12 years, and 9-12 years and 13-16 years. All regression analyses were adjusted for potential confounding factors (age, sex, neonatal morbidity-number of days in >30% oxygen and the number of days of ventilation- and social class, and for height, weight, serum LDL cholesterol concentration at follow-up, and room temperature). To compare the influence of the yearly growth on later FMD in adolescents born preterm with term subjects, the preterm population was divided into 2 groups by their early growth (median for weight gain in the first 2 postnatal weeks). Mean FMD in these two groups was compared with control subjects born at term using analysis of variance and p values were adjusted for multiple comparisons using Bonferroni's corrections. Statistical significance was taken as $p<0.05$ for all analyses.

Results

Subjects reviewed at age 13-16 years were representative of those recruited at birth in terms of birth weight, gestation, birth weight z score, discharge weight z score, social class and neonatal morbidity. There were no statistically significant differences in mean FMD between randomized dietary groups and this justifies combining all feed groups in the analyses below. Some background characteristics of subjects are given in Table 1a.

Birth Weight for Gestation and Later FMD

FMD was significantly related to birth weight z score and this association remained significant after adjustment for potential confounding factors (age, sex, height, weight, fasting LDL concentrations, room temperature, social class and neonatal morbidity expressed as the number of days of ventilation or days in >30% oxygen) (see Table 2).

Birth Weight for Gestation and Early Postnatal Growth

As expected, a low birth weight z score was associated with greater weight gain from birth to the second week postnatally (regression coefficient=−51.6 g per z score increase in birth weight; 95% CI: −61.6 to −41.5 g; p<0.001), and from birth to discharge (median age 4.4 weeks) (regression coefficient=−75.1 g per z score increase in birth weight; 95% CI: −114.9 to −35.3 g; p<0.001). These associations remained significant after adjustment for gestation, sex, neonatal morbidity (as above), social class or dietary group (standard versus nutrient enriched diet) (data not presented).

Postnatal Growth and Later FMD

Subjects who showed weight gain in the first 2 weeks of life had lower FMD % in adolescence (mean, SD: 5.5%, 2.6%; n=65) than those who had early weight loss (7.1%, 3.5%, n=37; 95% CI for difference=−2.4% to 0.7%; p<0.001). Similar significant results were obtained after adjustment for birth weight and gestation (p=0.01) (data not presented), or after the analysis was confined to subjects without intra-uterine growth retardation (weight above the 10th percentile for gestation) or to subjects with a birth weight above the mean for the population (1.4 kg) (data not presented). A greater neonatal growth rate (expressed as the change in z score for weight between birth and discharge or between birth and age 4 weeks) was associated with lower FMD in adolescence and these associations remained significant after adjustment for potential confounding factors (as above) (see Table 2). In contrast, growth expressed as the change in z score for weight between discharge and age 18 months, 18 months and 9-12 years, or between 9-12 years and 13-16 years was not related to later FMD (see Table 2).

To better define the period of neonatal growth that influenced later FMD, the period between birth and discharge was divided into two (between birth and the second week and between the second week and discharge). A greater growth rate between birth and the second week, but not between the second week and discharge, was associated with lower FMD in adolescence and this association remained significant after adjustment for potential confounding factors (as above) (se Table 2). Similarly, greater weight gain in the first 2 weeks postnatally was associated with lower FMD in adolescence (see Table 1a) independent of birth weight, gestation and possible confounding factors (as above) (see Table 2).

To exclude the possibility that postnatal weight loss due to fluid shifts rather than postnatal weight gain influenced later FMD, two further analyses were performed. First, we assessed the association of weight gain between the minimum weight afterbirth and the weight in the second week with later FMD. Greater weight gain during this period was associated with lower FMD in adolescence independent of birth weight, gestation and potential confounding factors (see above) (see Table 2). Second, greater length gain between birth and the second week, unlikely to be related to postnatal fluid loss, was associated with lower FMD in adolescence independent of birth weight, gestation and potential confounding factors (see Table 2).

Early Postnatal Growth and Later FMD: Group Comparisons

Mean FMD was greater in adolescents born preterm with weight gain in the first 2 postnatal weeks below the population median (−51.0 g) (mean: 7.4%; SD: 3.4%) than those with weight gain above the median (mean: 5.7%; SD: 2.9%; p<0.001) or control subjects born at term (mean 6.1%; SD 2.8%; p=0.027) (see FIG. 2). However, mean FMD in preterm subjects with early weight gain above the population median did not significantly differ from control subjects born at term.

Relative Contribution of Intra-Uterine and Early Postnatal Growth to Later FMD

There was no significant interaction between birth weight z score and weight change from birth to the second week on later FMD (p=0.56). All measures of postnatal growth (as shown in Table 2), potential confounding factors (as above), and birth weight z score were included in a stepwise multiple regression model. Only the change in weight between birth and the second week, and room temperature were statistically significantly related to later FMD (regression coefficients=−0.027 mm change per 100 g weight increase: 95% CI: −0.042 to −0.012 mm; p=0.001; and 0.009 mm change per 1° C. rise in room temperature; 95% CI: 0.002 to 0.016 mm; p=0.009).

A greater rate of weight gain during a critical window in the first two weeks after birth was associated with endothelial dysfunction up to 16 years later. Our data indicate in humans that rapid growth immediately after birth has adverse consequences later in life. FMD was greater in preterm infants who had a slower rate of growth than in those with the greatest growth, or, importantly, in control subjects born at term (FMD in these latter 2 groups did not significantly differ).

Our findings, therefore, now show that growth impairment during a brief window after birth may have long-term benefits to health. Our data shows that improvement in some aspects of long-term health can be achieved by early under nutrition. The first 2 weeks after birth appeared to be the sensitive period. Adolescents with the greatest weight gain during this period had 4.0% lower FMD than those with the lowest weight gain; a substantial effect on FMD, similar to that of insulin dependent diabetes (4%) and smoking (6%) in adults.

Study 2—The Effect of Under Nutrition on Insulin Resistance

The subjects were the same as in Study 1 and subjected to the same regime and trials and 32-33 split insulin concentrations (as a measure of insulin resistance was measured).

Sample size was estimated to exclude half a standard deviation in outcomes between randomized dietary groups in each of the trials and we required a maximum sub sample of around 250 subjects from our original cohort to detect this difference (with two parallel trials) at 80% power and 5% significance; and a minimum sample of around 200 subjects for 70% power and 5% significance. A subset of 216 subjects, which met our minimum criteria, agreed to participate at our initial attempt at recruitment and was found to be representative of the original population. For comparison of a nutrient enhanced versus standard neonatal diet (Trials 1 and 2 combined) this sample was sufficient to detect a 0.4 SD difference in fasting 32-33 split proinsulin concentration between randomized groups with 80% power and at 5% significance. Ethical approval for the follow-up study was obtained from national and local research ethics committees and written consent was obtained from all children, parents and their guardians.

Biochemistry

Blood was obtained by venopuncture between 0900 and 1100 (a.m.) after an overnight fast. Plasma was separated immediately, stored initially at −20° C. and then at −80° C., and thawed only once immediately before analysis. Glucose concentration was measured using a hexokinase method. 32-33 split proinsulin, intact proinsulin and insulin concentrations were measured in the laboratories of Professor Hales in Cambridge. Insulin concentration was measured using a one step chemiluminescent immunoenzymatic assay. Cross-reactivity with intact proinsulin was less than 0.2% at 400 pmol/L and with 32-33 split proinsulin, less than 1% at 400 pmol/L. Intact proinsulin and 32-33 split proinsulin concentrations were assayed using a time resolved fluorometric assay (Delfia). The solid phase antibody, bound to a microtitre plate, was the same in each case. The labeled antibody used in the 32-33 split proinsulin assay was donated by Dako Diagnostics Ltd. Intact proinsulin was supplied by the National Institute for Biological Standards and Controls (1st International Reagent 84/611), and chromatography purified 32-33 split proinsulin donated by Lilly Research Labs. The antibodies were labeled with Europium using the Delfia Europium labeling kit 1244-302 (Wallac. UK Ltd). The intact proinsulin assay typically shows less than 1% cross-reactivity with insulin and 32-33 split proinsulin at 2500 pmol/L and 400 pmol/L respectively. The 32-33 split proinsulin assay shows less than 1% cross-reactivity with insulin at 2500 pmol/L.

Statistical Analysis

The principal outcome was 32-33 split proinsulin concentration. Comparisons of normally distributed variables between randomized groups were made with Student's t test. Simultaneous multiple linear regression analyses were used to adjust differences between randomized groups for possible baseline differences. Infants born preterm and randomized to the lower nutrient diet were compared to adolescents born at term using Student's t test.

Multiple linear regression analyses were used to assess associations between the rate of neonatal and childhood growth (weight gain) and later insulin concentrations. Neonatal weight gain was expressed as the absolute value and as the standard deviation score from expected weight (z score) using percentages for infants born preterm. Growth beyond the neonatal period was calculated as the change in z score for weight between discharge and age 18 months, 18 months and 9-12 years, and 9-12 and 13-16 years. Current body mass index (BMI) was expressed, as the standard deviation score from expected BMI (z score) using national reference percentages. The distributions of 32-33 split proinsulin, proinsulin, and insulin concentrations were log transformed and then multiplied by 100. Therefore the log standard deviation multiplied by 100 represented the coefficient of variation and the coefficient in regression analyses represented the mean percentage change in insulin concentration per unit change in independent variable. Regression analyses were adjusted for potential confounding factors (sex, age, and BMI z score at current follow-up and neonatal morbidity-number of days in >30% oxygen and the number of days of ventilation- and social class at birth). Statistical significance was taken as p<0.05 for all significance tests, which were two tailed Results Analysis in Adolescents Born Preterm Subject Characteristics: there were no statistically significant differences in birth weight, gestation, standard deviation scores for birth and discharge weight, and clinical parameters between children who were or were not reviewed at age 13-16 years (see Table 1). As expected, the percentage of adolescents from a non-manual social background was greater at follow-up than at birth for both trials (see Table 1). However, there were no significant differences in neonatal characteristics, anthropometry, Tanner stage (median 4, inter-quartile range: 4-5), or social class between randomized dietary groups at follow-up (see Table 3).

Main Effect Comparison Between Randomized Dietga Groups

As planned, adolescents born preterm and randomized to a nutrient enriched diet (preterm formula) were compared with those randomized to the lower nutrient diet (banked breast milk or standard term formula). Fasting 32-33 split proinsulin (but not intact proinsulin, insulin or glucose concentration) was greater in adolescents randomized to the nutrient enriched diet than those randomized to one of the two lower nutrient diets (see Table 4). The effect sizes were similar in adolescents randomized to preterm formula compared to banked breast milk (Trial 1), or preterm formula versus term formula (Trial 2) (see Table 4) as evidenced by the lack of a significant diet by that interaction for later 32-33 split proinsulin concentration (p=0.5), intact proinsulin (p=0.3) and insulin concentration (p=0.8). This further justifies combining Trials 1 and 2. There was no sex difference in the effect of diet on fasting 32-33 split proinsulin concentration (the interaction between diet and sex on fasting 32-33 split proinsulin concentrations was not statistically significant; p=0.07).

In an explanatory analyses, the effect of diet on 32-33 split proinsulin concentrations remained significant after adjustment for birth weight and gestation, and potential confounding factors (see statistical methods above) (regression coefficient=18.4%; 95% CI of difference: 3.5% to 33.2%; p=0.016).

In the subsequent analyses only 32-33 split and intact proinsulin, but not insulin or glucose concentrations were significantly related to the early factors of interest (other data are not presented).

Effect of Early Postnatal Growth Programmed Later Proinsulin Concentrations

Because diet has a major influence on neonatal growth (see Table 3) we tested the hypothesis that postnatal growth programmed later 32-33 split and intact proinsulin concentrations. This was done in two ways: taking early postnatal growth as a continuous variable or as a dichotomous variable.

A greater neonatal growth rate (expressed as a continuous variable: the change in z score for weight between birth and discharge) was associated with higher fasting 32-33 split proinsulin and intact proinsulin in adolescence independent of birth weight, gestation and potential confounding factors (see statistical methods above) (see Table 5). To better define the period of neonatal growth that influenced later proinsulin concentrations the period between birth and discharge was divided into two (between birth and the second week, and between the second week and discharge). Only growth in the first 2 weeks was associated with higher fasting 32-33 split and intact proinsulin concentrations in adolescence (see Table 5).

Neonatal growth was taken as a dichotomous variable by comparing subjects who showed weight gain in the first 2 weeks of life (n=60) with those who had weight loss. Fasting 32-33 split proinsulin concentration was greater in subjects with early neonatal weight gain (geometric mean: 7.6 pmol/L, Coefficient of Variation, CV: 60%) compared to those with weight loss (5.9 pmol/L, CV 54%; mean difference 24%; 95% CI for difference=6.6% to 41.5%; p=0.007). Similar results were obtained for intact proinsulin (p=0.0003) (data not shown). The differences in 32-33 split proinsulin or intact proinsulin concentrations between neonatal weight gain groups remained significant after adjustment for birth weight and gestation (p=0.02 for 32-33 split proinsulin and p=0.03 for intact proinsulin).

To exclude the possibility that postnatal weight loss due to fluid shifts rather than postnatal weight gain influenced later fasting insulin concentrations, we assessed the association of weight gain between the minimum weight after birth and the weight in the second week with later proinsulin concentrations. Greater weight gain during this period was associated with higher 32-33 split and intact proinsulin concentration in adolescence independent of birth weight, gestation and potential confounding factors (as above) (see Table 5).

To assess the influence of postnatal growth beyond the neonatal period on later proinsulin concentrations, growth was expressed as the change in z score for weight between discharge and age 18 months, 18 months and 9-1' years, or between 9-12 years and 13-16 years. These variables were not significantly related to later, 32-33 split or intact proinsulin concentrations. Furthermore more rapid growth in the first 2 weeks post-natally was associated with greater 32-33 split proinsulin concentration in adolescence, without or without adjustment for current BMI z score (data not presented). Thus the influence of early growth on later 3'-33 split proinsulin concentration was independent of weight gain during childhood.

Effect of Antenatal Growth Programmed Proinsulin Concentrations

To explore the influence of antenatal, growth we assessed the associations between birth weight for gestation and later proinsulin concentrations. Only fasting proinsulin (but not 32-33 split proinsulin) concentration in adolescence was negatively associated with birth weight z score independent of potential confounding factors (as above) (see Table 5).

Our prospective experimental study was designed to assess the influence of early nutrition on later cardiovascular risk factors. We found that adolescents born preterm who were randomized to a lower nutrient diet, now recognized as sub optimal in terms of growth, had lower fasting 32-33 split proinsulin concentration, a marker of insulin resistance, than those randomized to a nutrient rich diet. Further analysis suggested that these dietary effects, seen up to 16 years after dietary randomization, were likely to operate by influencing neonatal growth rate. We suggest therefore that a reduced early growth rate as a consequence of relative under nutrition programs a lower insulin resistance and, by inference, a lower propensity to non-insulin dependent diabetes mellitus.

Data Tables

TABLE 1

Characteristics of Children Born Preterm who were Followed-up and not Followed-up In Adolescence[1]

| | Trial 1: Preterm Formula versus Banked Breast Milk | | | | Trial 2: Preterm Formula versus Term Formula | | | |
|---|---|---|---|---|---|---|---|---|
| | Followed up (n = 130)[2] | | Not followed up (n = 372) | | Followed up (n = 86) | | Not followed up (n = 338) | |
| Variable | mean | SD | mean | SD | mean | SD | mean | SD |
| Growth | | | | | | | | |
| Birth weight (kg) | 1.4 | 0.3 | 1.4 | 0.3 | 1.4 | 0.3 | 1.4 | 0.3 |
| (range) | (0.7 to 1.8) | | (0.6 to 1.8) | | (0.7 to 1.8) | | (0.5 to 1.8) | |
| Gestation (weeks) | 31.1 | 2.6 | 30.7 | 2.9 | 30.7 | 2.8 | 30.8 | 2.9 |
| (range) | (26-38) | | (25 to 39) | | (26 to 37) | | (24 to 39) | |
| Birth weight z score | −1.0 | 1.2 | −0.7 | 1.3 | −0.8 | 1.1 | −0.7 | 1.3 |
| Discharge weight z score | −2.1 | 1.0 | −2.0 | 1.1 | −2.1 | 1.0 | −2.1 | 1.0 |
| Demographical/clinical | | | | | | | | |
| Social Class | 3.4 | 1.5 | 3.6 | 1.9 | 3.5 | 1.6 | 3.8 | 1.8 |
| No. (%) non-manual[3] | 53 (41) | | 111 (30)[4] | | 35 (40) | | 97 (29)[4] | |
| Apgar at 5 min. of age | 8.3 | 1.7 | 8.0 | 1.9 | 7.8 | 1.8 | 8.0 | 20 |
| Days ventilation[5] | 0 | 0-4 | 1 | 0-5 | 1 | 0-4 | 1 | 0-6 |
| Days in >30% oxygen[5] | 2 | 0-7 | 4 | 1-8 | 2 | 0-16 | 3 | 0-10 |

TABLE 2

Regression Analyses of Endothelial Function in 216* Subjects (post-hyperaemic change in brachial artery diameter, mm)

| | Unadjusted | | | Adjusted[1] | | |
|---|---|---|---|---|---|---|
| Variable | Regression coef (mm) | 95% CI | p | Regression coefficient (mm) | 95% CI | p |
| Birth weight z score | 0.13 | 0.001 to 0.026 | 0.035 | 0.016 | 0.002 to 0.029 | 0.021 |
| Change in weight z score between: | | | | | | |
| 1. Birth and discharge | −0.026 | −0.046 to −0.007 | 0.007 | −0.030 | −0.055 to −0.006 | 0.016 |
| Birth and 4 weeks | −0.037 | −0.066 to −0.008 | 0.012 | −0.035 | −0.068 to −0.002 | 0.037 |
| Birth and 2 weeks | −0.057 | −0.087 to −0.024 | 0.001 | −0.062 | −0.096 to −0.028 | <0.001 |
| 2. 2 weeks and discharge | −0.025 | −0.056 to 0.005 | 0.10 | −0.013 | −0.052 to 0.026 | 0.52 |
| 3. Discharge and 18 months | 0.006 | −0.006 to 0.018 | 0.34 | 0.007 | −0.007 to 0.021 | 0.35 |

TABLE 2-continued

Regression Analyses of Endothelial Function in 216* Subjects
(post-hyperaemic change in brachial artery diameter, mm)

| | Unadjusted | | | Adjusted[1] | | |
|---|---|---|---|---|---|---|
| Variable | Regression coef (mm) | 95% CI | p | Regression coefficient (mm) | 95% CI | p |
| 4. 18 months and 9-12 yrs | −0.005 | −0.019 to 0.008 | 0.46 | −0.009 | −0.023 to 0.006 | 0.27 |
| 5. 9-12 yrs and 13-16 yrs | −0.003 | −0.027 to 0.022 | 0.82 | −0.007 | −0.034 to 0.019 | 0.57 |
| [2]Weight Change Between: | | | | | | |
| 1. Birth and 2$^{nd}$ week (100 g) | −0.026 | −0.040 to −0.012 | <0.001 | −0.024 | −0.043 to −0.006 | 0.009 |
| 2. Minimum weight and 2$^{nd}$ week (100 g) | −0.037 | −0.065 to −0.009 | 0.010 | −0.035 | −0.069 to 0.000 | 0.050 |
| [2]Length change between birth and 2$^{nd}$ week (cm)[3] | −0.002 | −0.004 to 0.000 | 0.03 | −0.002 | −0.004 to 0.000 | 0.041 |

Each line represents a separate regression model. All analyses adjusted for pre-hyperaemic brachial artery diameter.
*Slight loss of n in some models.
[1]Adjusted for age, sex, height, weight, fasting serum LDL cholesterol concentrations, room temperature, social class, and indices of neonatal morbidity (number of days of ventilation or days in >30% oxygen).
[2]Adjusted for confounding variables (as above) and birth weight and gestation.
[3]n = 100

TABLE 3

Comparison Characteristics of Preterm and Randomized to Different Diets at Birth

| | Trials 1 and 2 Combined | | | | Trial 1 | | | | Trial 2 | | | |
|---|---|---|---|---|---|---|---|---|---|---|---|---|
| | Preterm Formula (n = 106) | | Lower Nutrient Diet[1] (n = 110) | | Preterm Formula (n = 64) | | Banked Breast Milk (n = 66) | | Preterm Formula (n = 42) | | Term Formula (n = 44) | |
| Variable | mean | SD | mean | SD | mean | SD | mean | SD | mean | SD | mean | SD |
| Sex: No. males (%)[2] | 45 (42) | | 52 (57) | | 32 (50) | | 32 (49) | | 13 (31) | | 20 (45) | |
| Age (years) | 15.0 | 0.9 | 15.0 | 0.9 | 15.1 | 1.0 | 15.2 | 0.9 | 14.8 | 0.8 | 14.8 | 0.8 |
| Weight (kg) | 55.0 | 11.3 | 55.8 | 10.0 | 55.0 | 12.2 | 53.9 | 9.9 | 54.9 | 10.1 | 58.6 | 9.7 |
| 161.2 | 161.2 | 8.6 | 161.8 | 9.7 | 160.8 | 9.4 | 161.3 | 10.2 | 161.9 | 7.3 | 162.5 | 8.9 |
| Body mass index (kg/m$^2$) | 21.0 | 3.6 | 21.3 | 3.8 | 21.1 | 3.9 | 20.8 | 3.9 | 20.9 | 3.2 | 22.2 | 3.5 |
| Sum of skin folds(mm)[3] | 52 | 30-74 | 50 | 34-71 | 52 | 30-77 | 44 | 30-62 | 52 | 31-73 | 57 | 47-78 |
| Neonatal | | | | | | | | | | | | |
| Social | 3.4 | 1.4 | 3.5 | 1.7 | 3.5 | 1.3 | 3.4 | 1.7 | 3.4 | 1.7 | 3.6 | 1.6 |
| No. (%) non-manual[2] | 43 (41) | | 45 (41) | | 25 (39) | | 28 (42) | | 18 (43) | | 17 (39) | |
| Birth weight (kg) | 1.4 | 0.3 | 1.4 | 0.3 | 1.3 | 0.3 | 1.4 | 0.3 | 1.4 | 0.4 | 1.3 | 0.3 |
| Gestation (weeks) | 31.1 | 2.7 | 30.9 | 2.7 | 31.2 | 2.6 | 31.1 | 2.5 | 30.9 | 2.8 | 30.6 | 2.9 |
| Apgar at 5 minutes of age | 8.3 | 1.8 | 7.9 | 1.8 | 8.4 | 1.9 | 8.2 | 1.6 | 8.2 | 1.5 | 7.5 | 1.9 |
| Days in >30% oxygen[3] | 2 | 0-9 | 3 | 0-7 | 3 | 0-7 | 2 | 0-7 | 2 | 0-17 | 4 | 0-15 |
| Days in ventilation[3] | 0 | 0-4 | 0 | 0-4 | 0 | 0-4 | 0 | 0-3 | 1 | 0-4 | 1 | 0-4 |
| z score birth weight | −0.9 | 1.2 | −0.8 | 1.2 | −1.1 | 1.2 | −0.8 | 1.2 | −0.7 | 1.1 | −0.8 | 1.1 |
| z score discharge weight | −1.9 | 1.0 | −2.2 | 0.9* | −2.0 | 1.0 | −2.1 | 1.0 | −1.8 | 0.9 | −2.3 | 0.8* |
| Growth Change in weight z score between: | | | | | | | | | | | | |
| Birth and discharge | −1.0 | 0.7 | −1.4 | 0.7*** | −0.9 | 0.7 | −1.3 | 0.6** | −1.1 | 0.8 | −1.5 | 0.8* |

TABLE 3-continued

Comparison Characteristics of Preterm and Randomized to Different Diets at Birth

| | Trials 1 and 2 Combined | | | | Trial 1 | | | | Trial 2 | | | |
|---|---|---|---|---|---|---|---|---|---|---|---|---|
| | Preterm Formula (n = 106) | | Lower Nutrient Diet[1] (n = 110) | | Preterm Formula (n = 64) | | Banked Breast Milk (n = 66) | | Preterm Formula (n = 42) | | Term Formula (n = 44) | |
| Variable | mean | SD | mean | SD | mean | SD | mean | SD | mean | SD | mean | SD |
| Birth and 2 weeks | −1.0 | 0.5 | −1.1 | 0.4** | −0.9 | 0.5 | −1.1 | 0.4* | −1.0 | 0.5 | −1.2 | 0.5 |
| 2 weeks and discharge | −0.01 | 0.5 | −0.3 | 0.5*** | 0.05 | 0.5 | −0.2 | 0.4** | −0.1 | 0.5 | −0.4 | 0.5* |

TABLE 5

Regression Analyses of Early Growth and Later Proinsulin Concentrations In Adolescents born Preterm

| | Unadjusted | | | Adjusted[1] | | |
|---|---|---|---|---|---|---|
| Variable | Regression Coefficient (%) | 95% CI (%) | p | Regression Coefficient (%) | 95% CI (%) | p |
| 32-33 Split Proinsulin | | | | | | |
| Birth weight z score | −5.9 | −12.6 to 0.7 | 0.08 | −4.9 | −11.3 TO 1.5 | 0.1 |
| Change in weight z score between[2] | | | | | | |
| 1. Birth and discharge | 13.6 | 3.2 to 24.1 | 0.01 | 21.1 | 5.8 to 36.4 | 0.007 |
| 2. Birth and 2 weeks | 26.7 | 9.5 to 43.9 | 0.003 | 44.0 | 18.4 to 69.6 | 0.0009 |
| 3. 2 weeks and discharge | 8.4 | 8.6 to 25.4 | 0.3 | 8.6 | −11.7 to 28.8 | 0.4 |
| Weight Change between[2] | | | | | | |
| 1. Birth and 2nd week (per 100 g) | 13.2 | 5.4 to 20.9 | 0.001 | 15.6 | 6.3 to 24.8 | 0.001 |
| 2. Min. weight and 2nd week (per 100 g) | 19.0 | 3.3 to 34.8 | 0.02 | 22.9 | 5.4 to 40.4 | 0.01 |
| Proinsulin | | | | | | |
| Birth weight z score | −7.2 | −12.9 to −1.6 | 0.01 | −5.9 | −11.5 to −0.2 | 0.04 |
| Change in weight z score between[2] | | | | | | |
| 1. Birth and discharge | 16.0 | 7.1 to 24.8 | 0.0005 | 14.9 | 1.5 to 28.2 | 0.03 |
| 2. Birth and 2 weeks | 31.2 | 16.9 to 45.5 | <0.0001 | 37.3 | 15.4 to 59.1 | 0.0009 |
| 3. 2 weeks and discharge | 11.0 | 3.5 to 25.4 | 0.1 | 2.3 | −15.4 to 19.5 | 0.8 |
| Weight Change between[2] | | | | | | |
| 1. Birth and 2nd week (per 100 g) | 15.1 | 8.7 to 21.5 | <0.0001 | 14.9 | 7.1 to 22.7 | <0.0002 |
| 2. Min. weight and 2nd week (per 100 g) | 28.6 | 15.5 to 4.2 | <0.0001 | 24.5 | 9.6 to 39.4 | 0.001 |

Each line represents a separate regression model.
[1]Adjusted for: age, sex, current body mass index z score, social class, indices of neonatal morbidity (number of days of ventilation or days in ≥30% oxygen.)
[2]Adjusted for confounding factors (as above) together with birth weight and gestation. Small loss of n in some models.

What is claimed is:

1. A method for reducing the extent of or occurrence of long-term adverse health effects in human infants, comprising feeding to said infants when newborns, a nutrient-containing-formula providing 0.5 to 1.0 grams of protein per 100 ml of formula, comprising less than about 40% of the total calories in said formula of carbohydrates, and wherein the nutrient-containing-formula has a caloric density of 25 to 50 kcal per 100 ml of formula.

2. The method according to claim 1, where the long-term adverse health effects comprise long-term adverse vascular effects.

3. The method according to claim 2, where the long-term adverse vascular effects comprise development of atherosclerosis.

4. The method according to claim 2, where the long-term adverse vascular effects comprise coronary artery disease.

5. The method according to claim 2, where the long-term adverse vascular effects comprise propensity to insulin resistance and non-insulin dependent diabetes mellitis.

6. The method according to claim 1, where said feeding is carried out from birth to less than two months of age.

7. The method according to claim 1, where said feeding is carried out in the first two weeks of life.

8. The method according to claim 1, where said feeding is to preterm infants and is carried out from birth until the infant weighs 2000 gm.

9. The method according to claim 1, where said feeding is to preterm infants and is carried out from birth in a hospital until when the infant is discharged home.

10. The method according to claim 1 where the nutrient containing-formula has a caloric density of 35 to 45 kcal per 100 ml of formula.

11. The method according to claim 1 wherein nutrient containing-formula has a caloric density of 37 to 42 kcal per 100 ml of formula.

12. A method for reducing the extent or occurrence of long-term adverse health effects in human infants, comprising feeding to said infants when newborns, a nutrient-containing-formula providing about 2 grams of protein per 100 ml of formula and comprising less than about 40% of the total calories in said formula of carbohydrates.

13. A method for reducing the extent of or occurrence of long-term adverse health effects in human infants, comprising providing a powder and reconsistuting it to obtain a nutrient-containing-formula providing 0.5 to 1.0 grams of protein per 100 ml of said formula, comprising less than about 40% of the total calories in said formula of carbohydrates, and wherein the nutrient-containing-formula has a caloric density of 25 to 50 kcal per 100 ml of said formula and feeding said formula to said infants, when newborns.

14. The method according to claim 1, where the nutrient-containing-formula comprises 5% to 37% of the total calories in said formula of carbohydrates.

* * * * *